(12) United States Patent
Okayasu et al.

(10) Patent No.: US 7,010,569 B2
(45) Date of Patent: Mar. 7, 2006

(54) METHOD OF INFORMATION DISPLAY AND COMMUNICATION SYSTEM USING THE METHOD

(75) Inventors: Satoe Okayasu, Oomiya (JP); Hisashi Toyoshima, Hachiohji (JP); Chikako Tsuchiyama, Tokyo (JP)

(73) Assignee: Hitachi, Ltd., Tokyo (JP)

( * ) Notice: Subject to any disclaimer, the term of this patent is extended or adjusted under 35 U.S.C. 154(b) by 671 days.

(21) Appl. No.: 09/837,266

(22) Filed: Apr. 19, 2001

(65) Prior Publication Data

US 2001/0056468 A1 Dec. 27, 2001

(30) Foreign Application Priority Data

Jun. 27, 2000 (JP) ............................. 2000-197864

(51) Int. Cl.
*G06F 15/16* (2006.01)

(52) U.S. Cl. ...................... 709/204; 709/203; 709/217; 713/168; 713/176; 713/177

(58) Field of Classification Search ........ 709/200–253; 713/176, 177, 168
See application file for complete search history.

(56) References Cited

U.S. PATENT DOCUMENTS

| | | | |
|---|---|---|---|
| 6,094,675 A * | 7/2000 | Sunaga et al. .............. | 709/204 |
| 6,185,602 B1 * | 2/2001 | Bayrakeri ................... | 709/204 |
| 6,215,877 B1 * | 4/2001 | Matsumoto ................. | 380/277 |
| 6,223,347 B1 * | 4/2001 | Watanabe et al. ........... | 725/139 |
| 6,442,283 B1 * | 8/2002 | Tewfik et al. ............... | 382/100 |
| 6,594,652 B1 * | 7/2003 | Sunaga et al. ................. | 707/2 |
| 2001/0013041 A1 * | 8/2001 | Macleod Beck et al. ... | 707/500 |

FOREIGN PATENT DOCUMENTS

| | | |
|---|---|---|
| EP | 0936531 | 8/1999 |
| JP | 2000057327 | 2/2000 |
| WO | 0011834 | 3/2000 |

OTHER PUBLICATIONS

H. Yoshiura, et al "Internet-Marks: Clear, secure and portable visual marks for cyber worlds", Lecture Notes in Computer Science, Springer Verlag, NY, vol. 1796, May 17, 2000, pp. 195-202.

* cited by examiner

*Primary Examiner*—Nabil El-Hady
(74) *Attorney, Agent, or Firm*—Mattingly, Stanger, Malur & Brundidge, P.C.

(57) ABSTRACT

A communication system includes a community management server used by a communication manager and a participant's terminal used by a community participant participating in communication. The community management server manages multimedia data that has data about the community participant embedded therein, an element symbolizing the community participant, a data content display control part and a participant personal identification authentication part. The participant's terminal includes generation part for generating card-like information as a communication unit. When a plurality of community participants executes communication by using the cards to which the multimedia data are put, they can execute information display of personal information of the community participants, authentication of personal identification, and retrieval/edition of a speech content by using information embedded in the multimedia data.

3 Claims, 22 Drawing Sheets

FIG.4

| 401 | 402 | 403 | 404 | 405 | 406 | 407 | 408 | 409 | 410 | 411 |
|---|---|---|---|---|---|---|---|---|---|---|
| USER ID | USER NAME | HANDLE NAME | USER CONTACT ADDRESS | MAIL ADDRESS | USER ATTRIBUTE | PARTICIPATION BOARD ID | ACCESS LIMIT | MARK ID | MARK DATA | REGISTRATION DATE/HOUR |
| USER0001 | SUZUKI TARO | TARO | 1-23,○○CHO, A CITY | s-taro@aa.ne.jp | MALE, A SCHOOL 3RD GRADE, CLASS 2, FOOTBALL TEAM,··· | Bord0001.0002. 0004.0011 | Bord0001.0011 | marK0001 | | 2000.01.12 |
| | OFF | ON | OFF | ON | OFF | OFF | OFF | marK0004 | | 2000.01.14 |
| USER0002 | SUZUKI TARO | JIRO | 3-123,△△CHO, A CITY | Jtrou@aa.ne.jp | MALE, B SCHOOL 3RD GRADE, CLASS 5, FOOTBALL TEAM,··· | Bord0001.0011 | NO LIMIT | | | |
| | OFF | ON | OFF | ON | OFF | OFF | OFF | marK0002 | | 2000.01.30 |
| ··· | ··· | ··· | ··· | ··· | ··· | ··· | ··· | ··· | ··· | ··· |

FIG.5

| BOARD ID 501 | BOARD NAME 502 | BOARD INTRODUCTION 503 | BOARD GENRE 504 | BOARD URL 505 | BOARD MANAGER NAME 506 | COMMUNICATION ADDRESS 507 | MEMBER CONDITION 508 |
|---|---|---|---|---|---|---|---|
| Bord0001 | ON BEAUTIFICATION OF TOWN | THIS BOARD IS FOR CONSIDERING BEAUTIFICATION MEASURES A SCHOOL CAN COOPERATE | A SCHOOL, AREA, BEAUTIFICATION | http://www.aa.co.jp/bord0001 | PRINCIPAL OF A SCHOOL | aa@aa.ne.jp | PERSONS CONCERNED WITH A SCHOOL, PERSONS CONCERNED WITH B SCHOOL, PERSONS CONCERNED WITH A CITY OFFICE |
| Bord0002 | RECRUITING THEME OF CULTURAL FESTIVAL | RECRUITING THEME OF CULTURAL FESTIVAL AND OPERATING MEMBERS; POSITIVE OPINIONS ARE INVITED | A SCHOOL, CULTURAL FESTIVAL, OPERATING MEMBERS, RECRUITING | http://www.aa.co.jp/bord0002 | PRESIDENT OF STUDENT COUNCIL | t-hiro@aa.ne.jp | PERSONS CONCERNED WITH A SCHOOL |
| ... | ... | ... | ... | ... | ... | ... | ... |

FIG.6

| BOARD ID | BOARD LOG MANAGEMENT ID | CARD LOG MANAGEMENT ID | COMMENTS |
|---|---|---|---|
| Bord0001 | Bord0001-001 | mark0001-001 | SET UP FLOWERBED AND PLANT FLOWERS! |
| Bord0002 | Bord0002-001 | mark0002-003 | COLLECT RUBBISH ON SCHOOL WAYS! |
| | | mark0001-002 | I RUN FOR OPERATING MEMBER. |
| ... | ... | ... | ... |

601 602 603 604

800 INITIAL SCREEN IMAGE

FIG.11A

| 1101 | 1102 | 1103 | 1104 | 1105 | 1106 |
|---|---|---|---|---|---|
| USER ID | HANDLE NAME | MAIL ADDRESS | USER ATTRIBUTE | PARTICIPATION BOARD ID | ACCESS LIMIT |
| USER0001 | TARO | As-taro@aa.ne.jp | MALE, A SCHOOL, 3RD GRADE, CLASS 2, FOOTBALL TEAM | Bord0001.0002 0004.0011 | Bord0001.0011 |
| OFF | ON | ON | OFF | OFF | OFF |

| 1108 | 1109 | 1110 | 1111 |
|---|---|---|---|
| MARK PUTTING DATE/HOUR | CARD VALIDITY TERM | KEYWORD | COMMUNICATION COLUMN |
| 2000.01.13 | 2000.03.31 | BEAUTIFICATION, PLATING OF TREES, STATION ROAD, A SCHOOL, FOOTBALL, RECRUITING FOOTBALL TEAM MEMBERS | LET'S PLANT FLOWERS OF ORANGE COLOR AS TOWN COLOR. I AM A 3RD GRADE STUDENT OF A SCHOOL AND NOW RECRUITING FOOTBALL TEAM MEMBERS. |
| OFF | OFF | OFF | ON |

1112

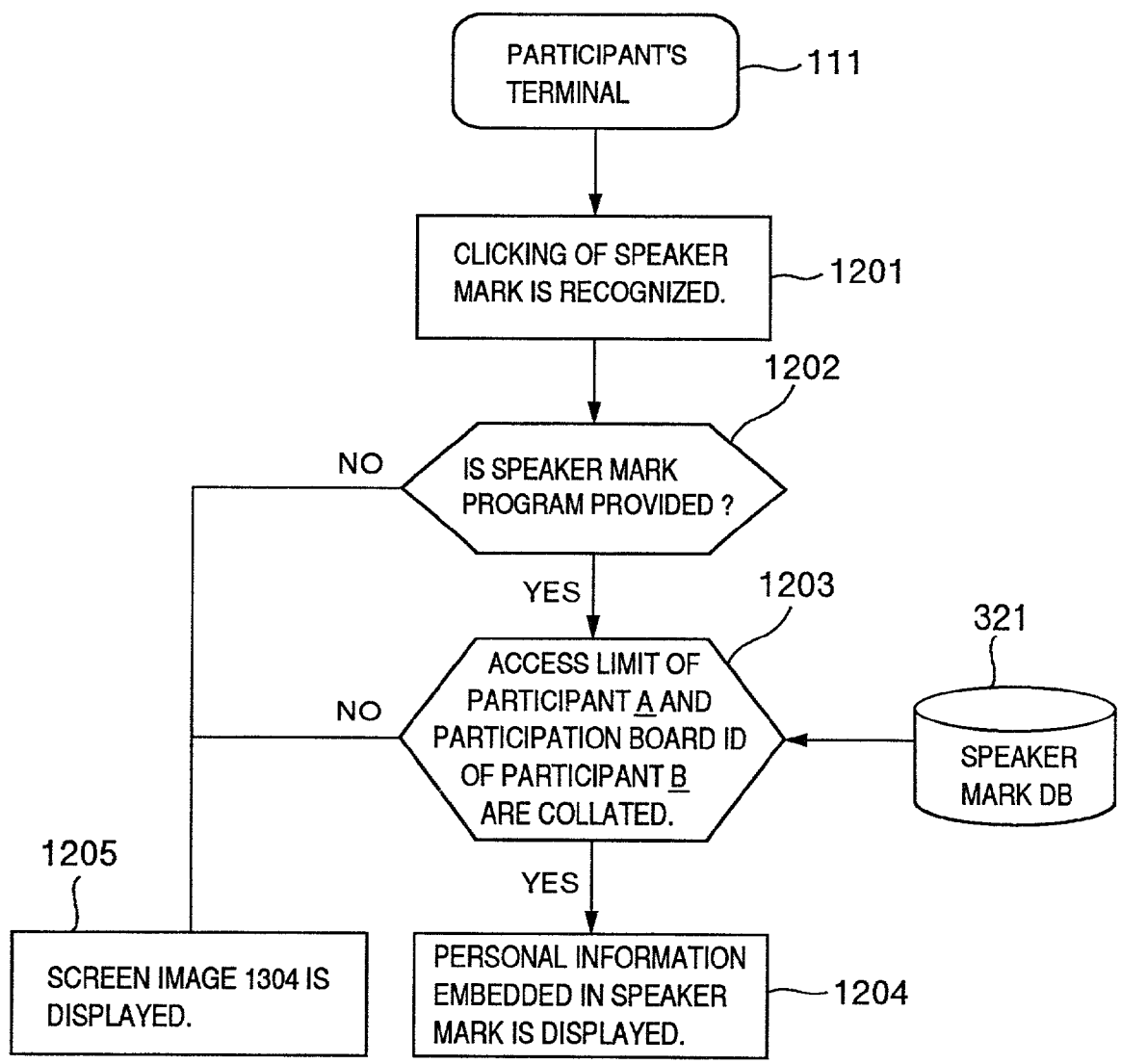

METHOD OF INFORMATION DISPLAY AND COMMUNICATION SYSTEM USING THE METHOD

BACKGROUND OF THE INVENTION

This invention relates to a method of displaying information about communication on a network and a communication system using the method. More particularly, this invention relates to a method of displaying information in communication such as a mail system, a board system, a chat system, etc, and a communication system using the method.

Cases have increased nowadays where users who cannot discuss in person facing each other due to geographical conditions and time conditions can exchange their views while sharing information by utilizing a network environment such as the Internet.

Technologies for realizing communication on a network include mail, a board system and a chat system. Various contrivances have also been developed to insure smooth communication on the network among "faceless" parties (hereinafter called "participants") that state and transmit any information.

For example, JP-A-11-312159 describes a communication method among users by using computer characters (avatars). This method generates an avatar having independent motion on the basis of a photo of an avatar generator, and changes the expression in accordance with the speech content or offers a voice message.

JP-A-11-203227 describes a screen expression method of speech content. This method changes a shape of a balloon and a display color for each speaker so as to express intention of the speaker or to visually stipulate the speaker. Since the speech content is displayed not only in the left-justify arrangement but also at random on the screen, expression power of the screen can be improved.

JP-A-2000-57327 describes a technology that enables a receiving party to output information containing information of a transmitting party that is embedded as "electronic watermark" in an image of the transmitting party.

As described above, methods of visually expressing the intentions and feelings of the users to insure smooth communication on the network have been available in the past, but the following problems have yet been left unsolved.

In the existing mail, board system and chat system, the speakers state in many cases their views under anonymity. According to this method, however, the speakers need not take responsibility for their speech and reliability of the speech content is likely to drop. When the mating party of communication is utterly of unknown identity, deeper communication is difficult in some cases. Nonetheless, disclosure of the information of the speakers such as their real names to the public is not preferable from the aspect of protection of privacy and also because the range in which communication is possible becomes narrower.

The method of the afore-mentioned JP-A-11-312159 can certainly provide a feeling of affinity by using the avatar. However, this method does not have means for displaying the attribute information of the speaker or its mail address, whenever necessary, and does not either establish a communication system that places the responsibility on the information transmitting party for their speech content while protecting privacy. A method that expresses the speech content in a tree structure, or sequentially or randomly is known as described in JP-A-11-203227, but the speech content cannot be edited or built up in the form in which communication becomes easier. In other words, this method cannot edit the speech content on the basis of the attribute information of the speaker and its speech content such as a group to which the speaker belongs or genre of the speech content, and on the basis of the speech sequence in such a fashion that the history and the result of communication are expressed in a more comprehensible form.

In communication such as an electronic mail or an electronic chat, JP-A-2000-57327 can display information of the transmitting party upon request by the receiving party, but this technology does not at all take protection of privacy of the transmitting party into account.

SUMMARY OF THE INVENTION

It is an object of the present invention to materialize a method of information display including information display control means such as personal information of a speaker, personal identification confirmation means of the speaker and retrieval/edition means of speech content, and a communication system using the method.

To accomplish the object described above, the present invention provides an information display method including information display control means such as personal information of a speaker, personal identification confirmation means and retrieval/edition means of speech content, wherein card-like information which has an element symbolizing each participant participating in communication and in which multimedia data containing attribute information of the participant and attribute information of the speech content are embedded is displayed on a board as a site of communication.

The object of the invention described above can be accomplished by a communication system including at least one client terminal used by a participant participating in communication, a board as a site of communication and at least one management server used by a manager managing multimedia data symbolizing the participant, wherein the management server includes means for embedding data about the participant in the multimedia data when receiving a request from the client terminal and means for sending the multimedia data to the client terminal; and the client terminal includes means for generating card-like information as a communication unit, means for embedding data about the card-like information in the multimedia data sent from the management server, means for putting or pasting the multimedia data to the card-like information, means for collating access limit information embedded in the multimedia data with access condition information stored in the client terminal, means for inhibiting the information embedded in the multimedia data from being displayed when the result of collation is not coincident, and means for displaying information to which display setting is made among the information embedded in the multimedia data when the result of collation is coincident.

To accomplish a communication system equipped with personal identification confirmation means, the present invention provides a communication system wherein the management server described above includes means for embedding data about the participant and electronic signature of the manager about the data in the multimedia data when receiving a request from the client terminal, and means for putting a public key to the multimedia data and sending them to the client terminal; and the client terminal described above includes means for generating card-like information as a communication unit, means for embedding data about the card-like information and electronic signature of the participant in the multimedia data sent from the management server, means for putting a public key for decoding electronic signature of the participant to the multimedia data and then putting the multimedia data to the card-like information, means for collating the public key for electronic signature of the management server put to the multimedia data with a public key distributed in advance or acquired from the management server, means for collating the public key for electronic signature of the participant put to the multimedia data with a public key distributed in advance or acquired from the management server, means for displaying a notice to the effect that personal identification cannot be confirmed when the result of collation is not coincident, and means for displaying a notice to the effect that personal identification can be confirmed when the result of collation is coincident.

To accomplish a communication system equipped with retrieval/edition means of speech content, the present invention provides a communication system wherein the management server described above includes means for embedding data about the participant in the multimedia data when receiving a request from the client terminal, means for sending the multimedia data to the client terminal and means for retrieving the board by using data about the participant embedded to the multimedia data; and the client terminal described above includes means for retrieving information on the board by using information embedded in the multimedia data, and means for editing and displaying the retrieval result by using information embedded in the multimedia data.

BRIEF DESCRIPTION OF THE DRAWINGS

FIG. 4 shows a data construction of a speaker mark management DB 221 and a data example in the embodiment;

FIG. 5 shows a data construction of a board management DB 222 and a data example;

FIG. 6 shows a data construction of a board log management DB 223 and a data example;

FIGS. 11A and 11B show a data construction embedded in a speaker mark by the communication management server 101 and a data example, and a data construction embedded in the speaker mark by the community participant 110 and a data example, respectively, in the embodiment;

FIG. 12 is a flowchart showing the procedure for the community participant to read information embedded in the speaker mark in the embodiment;

DESCRIPTION OF THE EMBODIMENTS

Preferred embodiments of the present invention will be described hereinafter with reference to the accompanying drawings. The present invention will be explained in detail about an example of a communication system utilizing a speaker mark in an educational community (Embodiment 1).

Embodiment 1

Figure 1:
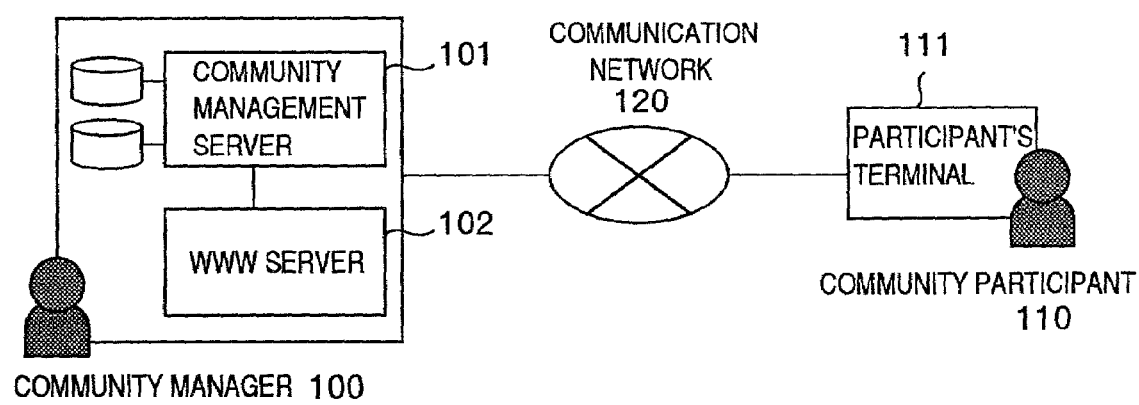
FIG. 1 shows a schematic system construction according to an embodiment of the present invention.

FIG. 1 shows a schematic construction of this embodiment. This embodiment pertains to a system that is utilized by a community manager 100 managing a group (hereinafter called "community") of persons gathering to discuss a certain theme on a network such as the Internet, and by community participants 110 that are practical community members and participate in communication. A community management server 102, a WWW server 103 and participants' terminals 111 are connected to one another through a communication network 120 such as a local area network.

Incidentally, a plurality of community managers 100 and a plurality of community participants 110 connected to the communication network 120 may exist inside the same communication network, or may be connected to another community through the communication network. This embodiment employs the construction in which the community manager 100 manages the community management server 101 and the WWW server 102 that are connected to each other. However, each of the community management server 101 and the WWW server 102 may be individually connected to the communication network 120.

The community management server 101 is the server that manages the speech contents of the community participants 110 in the form of a text, multi-media data, etc, (hereinafter called "card") on the site of speech (hereinafter called "board") of the community existing on the network in which the community manager 100 takes part, and speaker marks in which the individual information of the speaker and the content of the card is embedded.

The WWW server 102 is the one that displays a registration screen of the speaker marks for ordinary users other than the community participants 110.

Here, the speaker mark is multi-media data that symbolize the community participants 110. It will be assumed that the speaker mark contains or have embedded therein attribute information of the community participants and attribute information of the speech contents of the community participants 110. In this instance, it is possible to use a digitized data obtained by digitizing a photo of each community participant 110 by a scanner or a digital camera, or deforming the photo by a personal computer to obtain multi-media data representing the appearance of the community participant. When it is not possible, or is not desirable, to use the data representing the appearance, personified multi-media data capable of adding a look or countenance of the community participant 110 may be used, too.

The participant's terminal 111 is terminal equipment the community participant 110 utilizes. Using the participant's terminal 111, the communication participant 110 can prepare the card for speaking to the board, can retrieve and edit, and can exchange data with the community manager 100. The community management server 101 manages the data that is private to parties other than the community manager 100 among the data of each speaker mark and the data necessary for managing by speaker mark management DB 223. The participant's terminal manages the data that the community participants 110 can re-write and the data relating to the speech content. When information about a contact address or the speaker mark information is to be changed, the community participant 110 generates an updating request of the speaker mark to the community management server 101, and the community manager 100 transmits the updated speaker mark to the participant's terminal 111.

Figure 2:
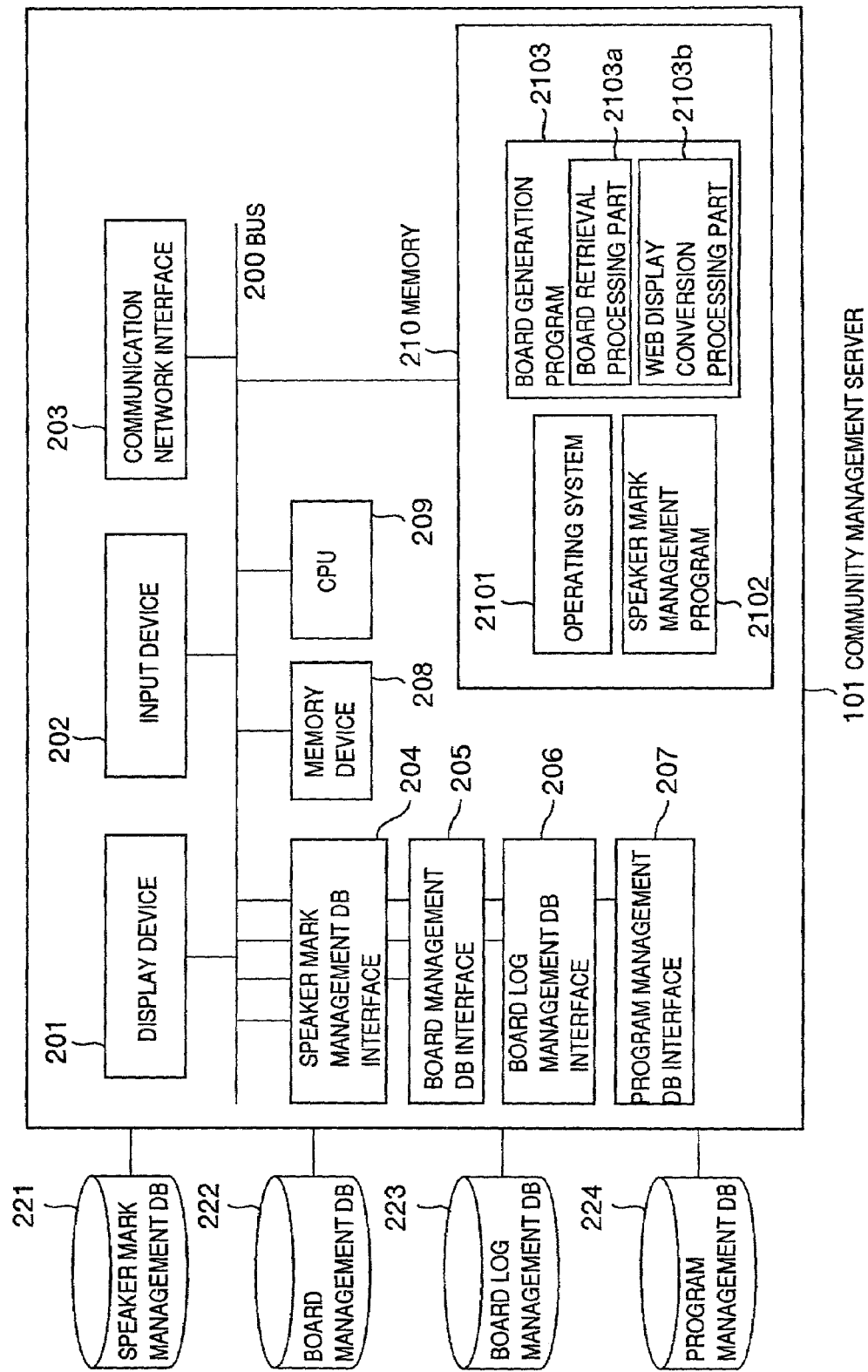
FIG. 2 shows a schematic construction of a community management server 101 in the embodiment.

FIG. 2 shows a schematic construction of the community management server 101 in this embodiment.

The community management server 101 includes a display device 201, an input device 202, a communication network interface 203, a speaker mark management DB interface 204, a board management DB interface 205, a board log management DB interface 206, a program management DB interface 207, a memory device 208, a CPU 209 and a memory 210. A bus 200 connects these members 201 to 210 to one another. A speaker mark management DB 221, a board management DB 222, a board log management DB 223 and a program management DB 224 are connected as external memory devices.

The display device 201 is used for displaying the message, etc, to the community manager 100 using the community management server 101, and is a CRT or a liquid crystal display, for example. The input device 202 is used by the community manager 100 using the community management server 101 to input data, command, etc, and is a keyboard or a mouse, for example. The communication interface 203 is an interface used for exchanging data between the participant's terminal 111 and other manager terminal through the communication network 120.

The speaker mark management DB interface 204 is an interface for exchanging data with speaker mark management DB 221. The speaker mark management DB 221 manages data such as the user ID, the user name, the mark ID, the mark data, and so forth, in association with one another, and is shown in FIG. 4, for example. Only those who are authorized can update this speaker mark management DB 221.

The board management DB interface 205 is an interface for exchanging data with the board management DB 222. The board management DB 222 manages the data such as the board ID, the board name, the board URL, etc, in association with one another, and its example is shown in FIG. 5. Only those who are authorized can update the board DB 222.

The board log management DB interface 206 is an interface for exchanging data with the board log management DB 223. The board log management DB 223 manages the content of the card put onto the board in association with the data such as the board ID, the board log management ID, the mark log ID, etc, and its example is shown in FIG. 6. Only those who are authorized can update the board log management DB 223.

The program management DB interface 207 is an interface for exchanging data with the program management DB 224. The program management DB 224 manages the data such as version management in association with one another. Only those who are authorized can update the program management DB.

The memory device 208 is used for storing permanently the program and the data used in the community management server 101, etc, and is a hard disk or a floppy disk, for example.

The CPU 209 collectively or integratedly controls each part constituting the community management server 101 and executes various arithmetic operations. The memory 210 temporarily stores programs such as an OS 2101, a speaker mark management program 2102 and a board generation program 2103 that are necessary for the CPU 209 to execute the processing described above.

Here, the OS 2101 is a program for accomplishing the functions such as file management, process management or device management, for controlling the community management server 101 as a whole.

The speaker mark management program 2102 is a program that receives new registration/updating request of the speech mark from the community participant 110, generates the speaker mark by filling the personal information to the multi-media data set by the community participant, and executes outputting member registration to the requesting party.

Confirmation notice by mail or authentication by telephone may be conducted in order to confirm whether or not any error exists in the personal information transmitted by the community participant 110 or whether or nor the community participant 110 is a real existing person.

The board generation program 2103 is a program that generates the board, and puts a card to the board and displays it in accordance with the request of the community participant 110. The board generation program 2103 includes a board retrieval processing part 2103a and a Web display conversion processing part 2103b. When the community manager 100 receives a board new registration/updating request, the board retrieval processing part 2103a executes board retrieval by deciding to a board of which theme the card generated by the community participant 110 is to be put, or by guiding the community participant 110 to a board managed by the community management server 101 by using the content embedded in the speaker mark. The Web display conversion processing part 2103b converts the board information to the form that can be displayed on ordinary browsers for users not having the board display program 3102.

Incidentally, the information to be embedded to the speaker mark is the one shown in FIG. 11A. A technology that embeds specific information to image data is known as "electronic watermark". This electronic watermark technology is described in "Nikkei Electronics", No. 683, 1997, p. 100–107. The electronic watermark includes an invisible watermark that embeds information in the form that is invisible to human eyes and a visible watermark that embeds the information in the form visible to human eyes. It is believed that the quantity embedded has a limit in the case of the invisible watermark. In the case of the speaker mark, mark design symbolizing the community participants 110 can be changed to a certain extent without particular problem, by increasing the color tone, for example, within the range in which the image of the community participants 110 is not damaged when other community participants watch the mark. Therefore, a certain quantity of information can be embedded even when the invisible watermark is used.

Figure 3:
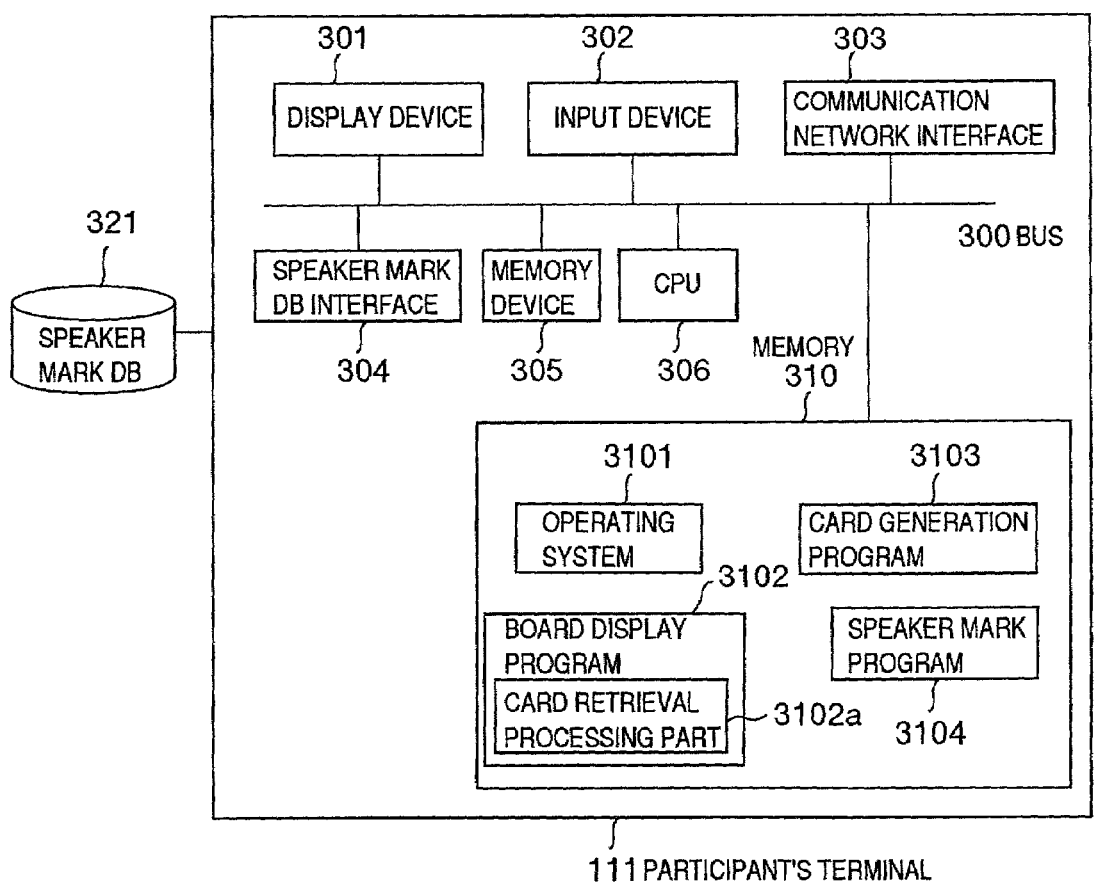
FIG. 3 shows a schematic construction of a participant's terminal 111 in the embodiment.

FIG. 3 shows a schematic construction of the participant's terminal 111 in this embodiment.

The participant's terminal 111 includes a display device 301, an input device 302, a communication network interface 303, a speaker mark management DB interface 304, a memory device 305, a CPU 306 and a memory 310. A bus 300 connects these members to one another. A speaker mark DB 321 is connected as an external memory device.

The display device 301 is used for displaying message, etc, to the community participant 110 using the participant's terminal 111, and is a CRT or a liquid crystal display, for example. The community participant 1110 using the participant's terminal 111 uses the input device 302 for inputting data and commands. It is a keyboard or a mouse, for example. The communication network interface 303 is an interface for exchanging data with the community management server 101, the WWW server 102 and other participants' terminals through the communication network 120.

The speaker mark DB interface 304 is an interface for exchanging data with the speaker mark DB 321. The speaker mark DB 321 associates the registered speaker mark sent from the community management server with the data such as a header, an expression table, etc, generated when the community participant forms the card, and manages them. It is an expression table 1005 shown in FIG. 10, for example.

The memory device 305 is used for permanently storing a program and data used for the participants' terminals 111, and is a hard disk or a floppy disk, for example.

The CPU 306 collectively controls each part constituting the participant's terminal 111 and executes various arithmetic operations. The memory 310 temporarily stores programs that are necessary for the CPU to execute the processing described above, such as OS 3101, a board display program 3102, a card generation program 3103 and a speaker mark program 3104.

Here, the OS 3101 is a program for accomplishing functions such as file management for controlling the participants' terminals 111 as a whole, process management or device management.

The board display program 3102 is a program for displaying the board and the card on the board in accordance with the request from the community participant 110 and for re-arranging the cards on the board and displaying them. The board display program 3102 includes a card retrieval processing part 3102*a* for retrieving the cards put on the board by using personal data embedded in the speaker mark. Incidentally, the board display program 3102 may include in advance a model (hereinafter called "template") of a map type, a matrix type, a time series display type, or the like, in order to re-arrange the cards on the board.

The card generation program 3103 is a program for enabling the community participant 110 to generate afresh or update the card. It is a card generation program that is activated when receiving the card generation request from the community participant 110 and generates the card.

The speaker mark program 3104 has the function of embedding information necessary for the speaker mark DB 321 among the cards generated by the community participants 110 in the speaker mark, the function of receiving the expression table from the speaker mark DB 321, selecting the speaker mark that has added the expression corresponding to the speech content and putting the speaker mark to the card, and the function of displaying the information embedded in the speaker mark when the cards of other community participants having the speaker mark put thereto are looked up.

FIG. 4 shows a data construction stored in the speaker mark management DB 321 in this embodiment and a data example. The speaker mark management DB 321 stores, on the basis of a predetermined standard and in a unified expression form, a user ID 401, a user name 402, a handle name 403, a user contact address 404, a mail address 405, a user attribute 406, an access limit 407, a participation board ID 408, a mark ID 409, a mark data 410, a registration date 411, a display permission flag 412, and so forth. When a new speaker mark is registered or the content of the existing speaker mark is changed, the speaker mark management DB 221 receives the updating request from the community participant 110, and the community manager 100 updates the speaker mark management DB 221.

The user ID 401, the participation board ID 408, the mark ID 409 and the registration date 411 are the information that the speaker mark management DB 221 allocates for the purpose of management. The user name 402, the handle name 403, the user contact address 404, the mail address 405, the user attribute 406, the access limit 407, the mark data 410 and the display permission flag 412 are the information that the community participant 110 applies when registering the speaker mark.

The data stored in the speaker mark management DB 221 include the information that controls the display of the speech content, and the personal information and the card content that are directed to retrieval and edition of the speech content.

The data may further include authentication information such as an electronic signature in order to evidence that the speech content is the one from the requesting party.

Incidentally, one community manager can register a plurality of speaker marks. In this case, the user ID 410 is one, but the numbers of the mark ID 409, the mark data 410 and the registration date 411 increase.

The user attribute 406 is the area to which personal information such as the sex, age, occupation, genre of interest, etc, of the communication participant are inputted.

The access limit 407 limits the reference to the personal information of the community participant. It is the information for controlling display of the information embedded in the speaker mark. For example, the access limit 407 may be set so that other community participants registered as the members to the same board can look up the embedded information but other community participants who are not the members of the same board but are registered as the community participants to other boards cannot look up.

The participation board ID 408 stores the board ID, which the communication manager 100 is permitted to register as the member, to the board satisfying the conditions, by looking up the user attribute 406 inputted when the community participant 110 registers the speaker mark and the member condition 508 of the board shown in FIG. 5. When receiving the member registration approval, the community participant 110 acquires the speaker mark storing the participation board ID 408 capable of participation and finishes registration.

FIG. 5 shows a data construction stored in the board management DB 222 and a data example in this embodiment. The board management DB 222 stores, on the basis of the standard described above and in the unified expression form, a board ID 501, a board name 502, a board introduction 503, a board genre 504, a board URL 505, a board manager's name 506, a contact address 507, a member condition 508, and so forth. The board management DB 222 is updated when a new board is generated or when a board is deleted.

The data to be stored in the board management DB 222 may contain day/time data representing validity of the board to which a card is to be put within a term such as balloting or questionnairing, or for arranging the boards in accordance with the term when the number of the boards becomes too excessive.

FIG. 6 shows a data construction stored in the board log DB 223 and a data example in this embodiment. The board log management DB 223 stores, on the basis of a predetermined expression standard and in a unified expression form, a board ID 601, a board log management ID 602, a mark log management ID 603, a comment 604, and so forth. A board manager 506 managing the boards or a community manager 100 may arbitrarily set the term in which the board log management ID 602 and the mark log management ID 603 are stored as the log.

The board log management ID 602 may be a serial number of the board ID or day/time data when the log of the board is acquired. The mark log management ID 603 may comprise the combination of the mark ID with the serial number of the mark ID or the combination of the mark ID with the day/time data when the mark is put to the card. Incidentally, the data stored in the board log management DB 223 may contain the log management ID of the card as the day/time data representing in which sequence the cards are put on the board in order to know that a next card is put by reflecting the opinions of the cards put previously timewise.

Figure 7:
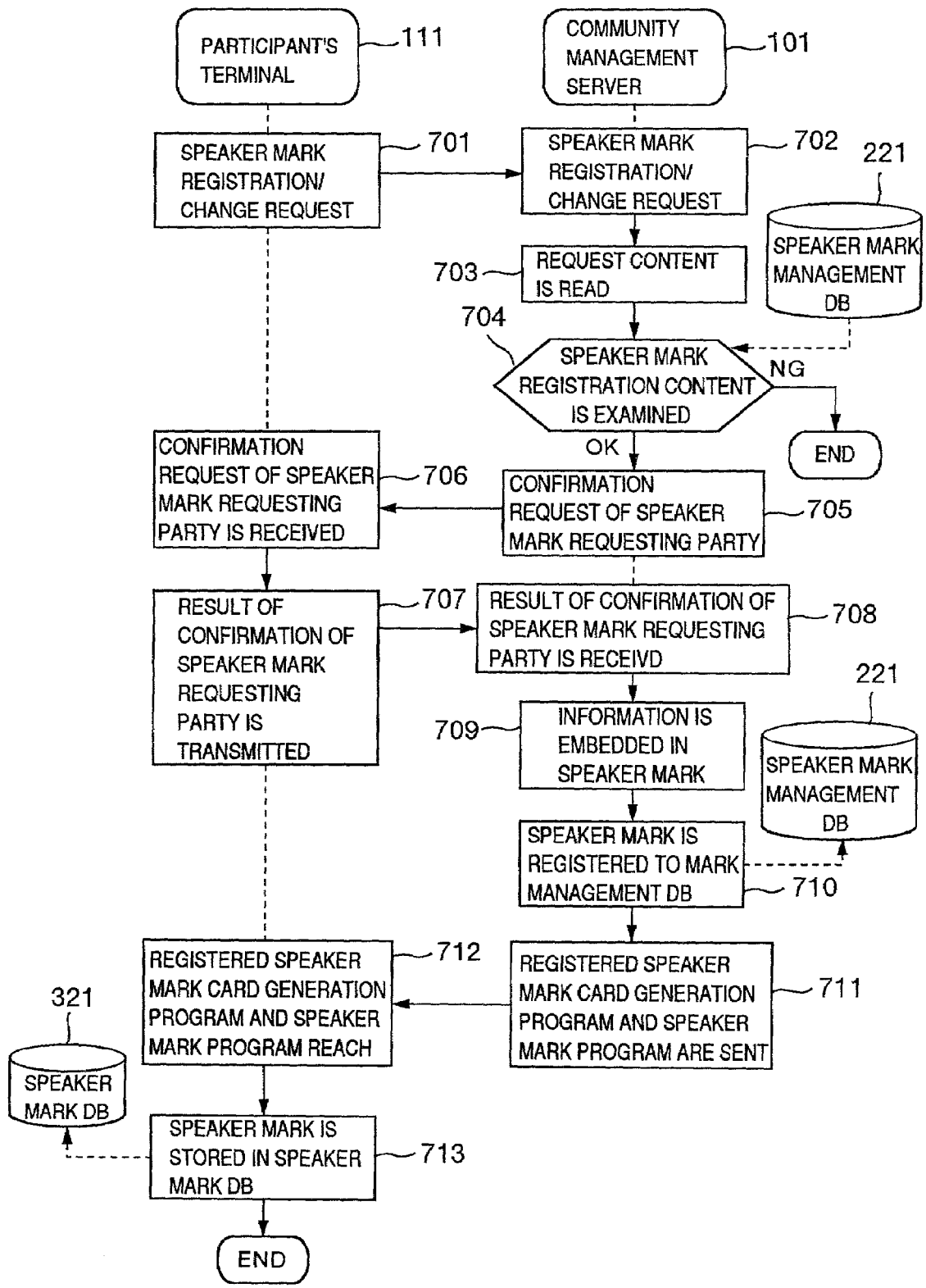
FIG. 7 is a flowchart showing the procedure for a community participant to execute speaker mark registration in the embodiment.

FIG. 7 is a flowchart showing the processing flow of speaker mark registration executed by the community participant in this embodiment. FIG. 7 shows the processing flow for registering the speaker mark between the participant's terminal 111 and the community management server 100.

First, the participant's terminal 111 displays a screen for inputting the information necessary for registering the speaker mark and transmits the registration request of the speaker mark to the community management server 101 (Step 701). This screen is an initial screen image 800 shown in FIG. 8, for example.

The speaker mark management program 2102 of the community management server 101 receives the speaker mark registration request (Step 702) and judges whether or not the speaker mark has already been registered to the speaker mark management DB 221, from the user name 402 of the community participant requesting registration, the handle name 403, the user contact address 404 and the mail address 405 (Steps 703 and 704). When the registration request is new registration, the speaker mark management DB 221 allocates the user ID 401 and the mark ID 409 and transmits a confirmation request of the speaker mark to the requesting mail address 405 (Step 705). Receiving the confirmation request of the speaker mark request, the participant's terminal 111 notifies once again the community management server 101 of the receipt of the confirmation request in order to evidence that the mail address 405 is correct (Steps 706 and 707). After confirming the receipt of the confirmation reception result (Step 708), the community management server 101 embeds the information in the speaker mark from among the information inputted in the initial screen image 800 (Step 709). FIG. 11A shows an example of the information embedded by the community management server 101 in the speaker mark. After the community participant 110 is registered to the speaker mark management DB 221 (Step 710), a registered speaker mark, a card generation program 3103 and a speaker mark program 3104 are distributed (Step 711). This distribution may be made by mail or by writing of URL and a download ID storing the registered speaker mark, the card generation program 3103 and the speaker mark program 3104 to the community participant 110, or by using a memory medium such as a CD-ROM or a floppy disk.

The information to be embedded to the speaker mark may be arranged so that it can be set to each community. The community participant cannot change the data stored in the speaker mark management DB 221. When it is desired to change the registered data, the community participant 1110 transmits the speaker mark change request. Receiving this request, the speaker mark management DB 221 reads the registered mail address 405 and transmits a speaker mark change confirmation request.

To strictly conduct authentication, the participant is required to submit a document capable of certifying personal reference such as a resident card, a health certificate or a driver's license at the time of registration request of the speaker mark. Callback or a request for confirmation notice is then made to the contact address described in the document.

Figure 8:
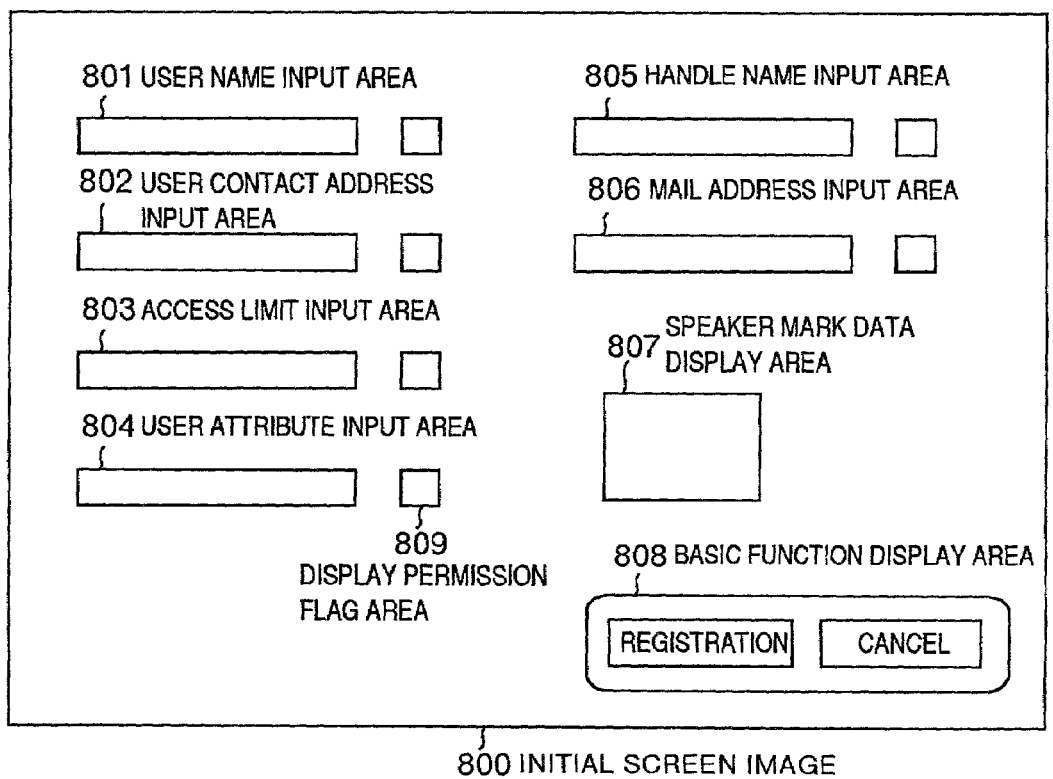
FIG. 8 shows an example of an initial screen image at the time of speaker mark registration or change request in the embodiment.

FIG. 8 shows an example of an initial screen image of speaker mark registration or a change request in this embodiment. The drawing shows the initial screen image for accepting the information necessary for registering the speaker mark and the information that is stored in the speaker mark management DB 221 and is added by the speaker mark.

The initial screen image 800 is an area for allowing the community participant 110 to input the information to be added to the speaker mark, and includes a user name input area 801, a user contact address input area 802, an access limit input area 803, a user attribute input area 804, a handle name input area 805, a mail address input area 806, a speaker mark data display area 807, a basic function button area 808 for transmitting a registration or change request of the speaker mark to the community management server 101 and a display permission check area 809. However, the initial screen 800 represents an arrangement example of each area and is not limited to this arrangement. Selection of display/non-display of the information to other community participants may be arranged so that it can be set to each community.

A design of the speaker mark prepared by the community participant or a design selected from a design list offered by the community manager 100 is registered to the speaker mark data display area 807.

The community participant 110 transmits the speaker mark registration request to the community management server 101 through the initial screen 800. When registration of the speaker mark to the speaker mark management DB 221 is completed, the community participant 110 is approved as a community participant.

Figure 9:
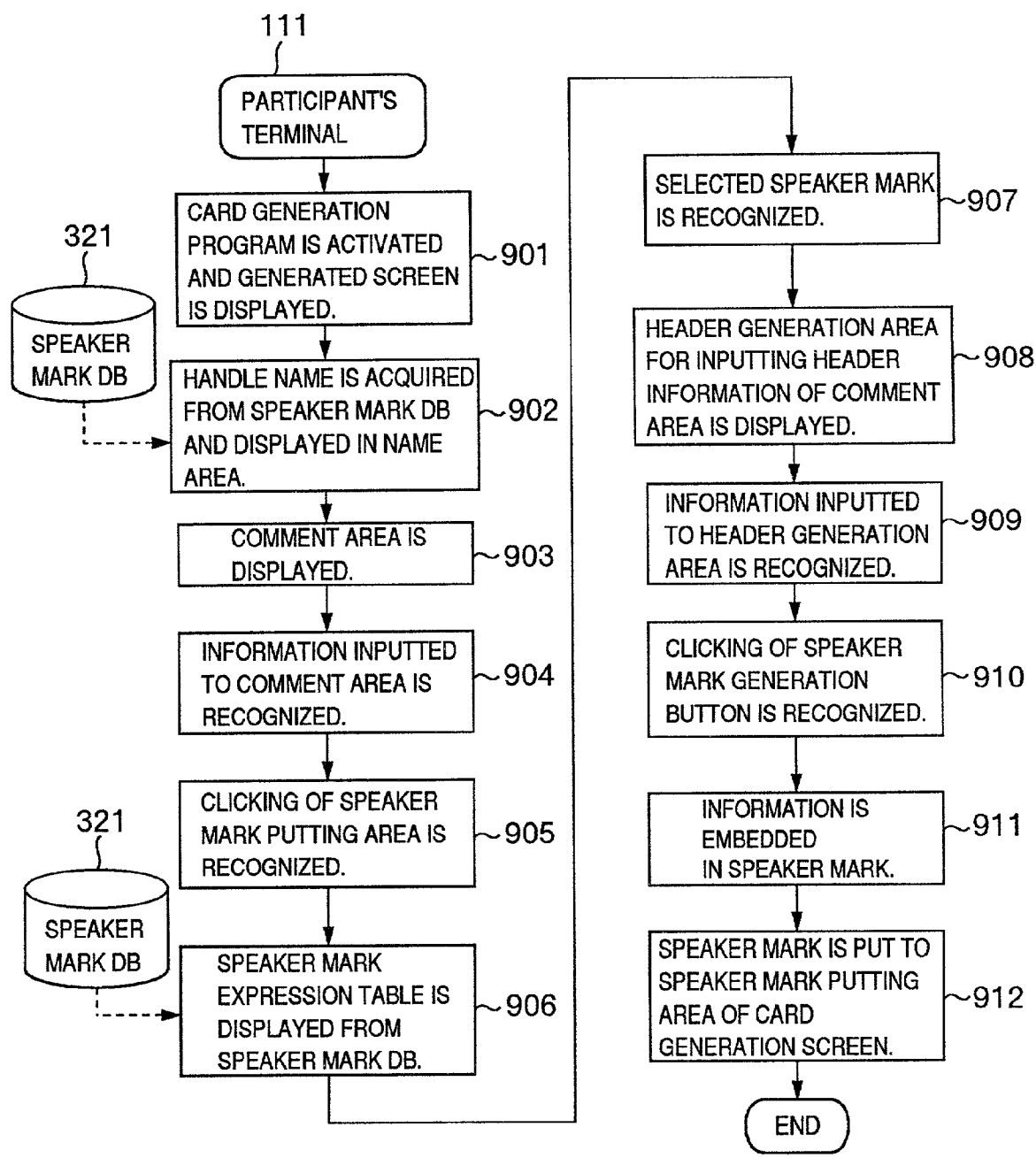
FIG. 9 is a flowchart showing a card generation processing in the participant's terminal 111 in the embodiment.
Figure 10:
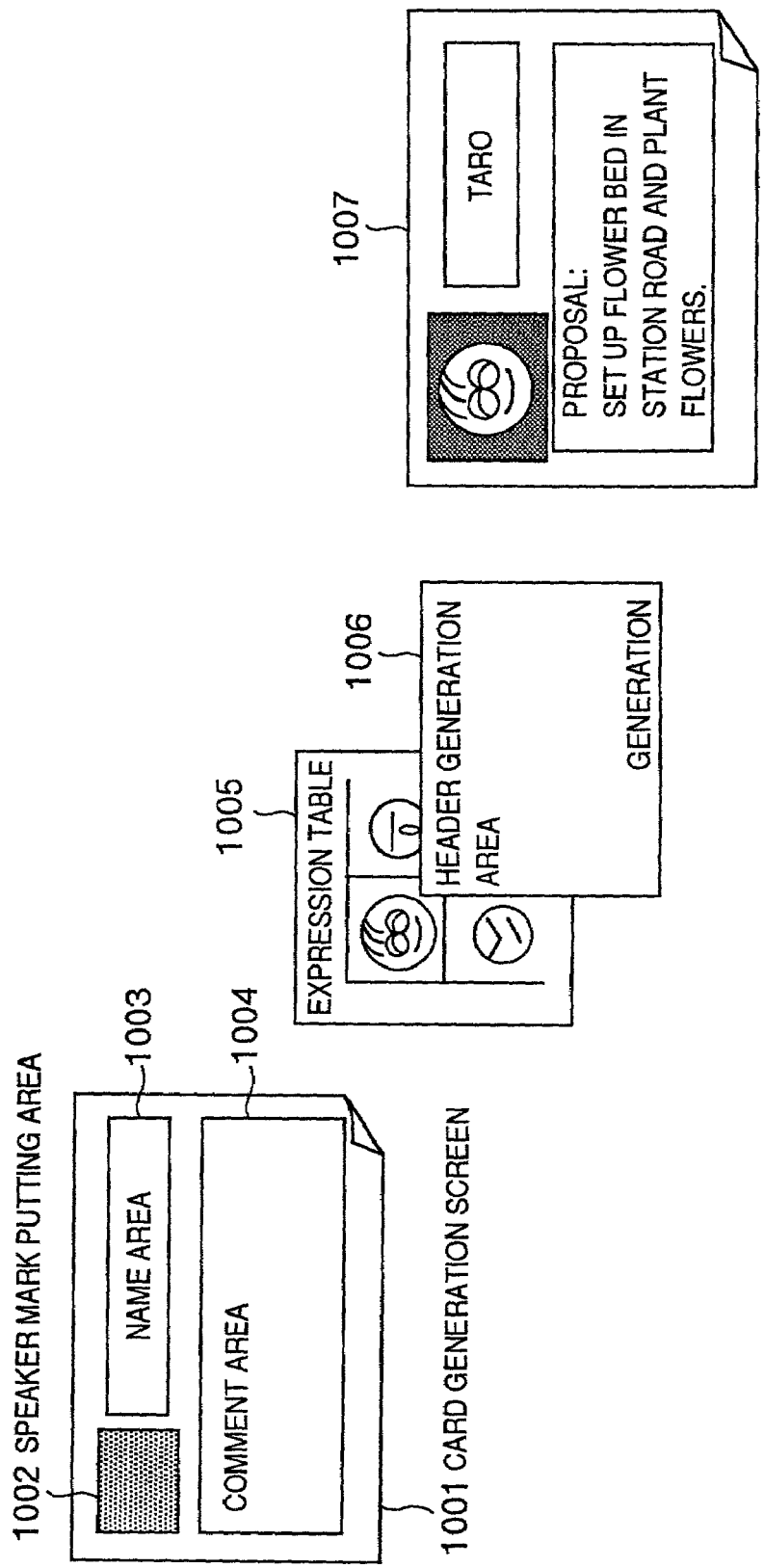
FIG. 10 shows an image example of a processing screen corresponding to a processing flow shown in FIG. 9 in the embodiment.

FIG. 9 is a flowchart showing a generation processing of the card at the participant's terminal 111 in this embodiment. FIG. 9 shows a processing flow for transmitting new generation/updating request of the card by the participant terminal 111 by using the card generation program 3103, selecting the speaker mark with the speaker mark DB 321 and putting the speaker mark to the car by using the speaker mark program 3104. FIG. 10 shows an image example of a processing screen corresponding to the processing flow shown in FIG. 9 in this embodiment.

When the community participant 110 activates a card generation program 3103 to generate the card, a screen such as a card generation screen 1001 is displayed (Step 901), and a handle name of the community participant 110 is acquired from the speaker mark DB 321 (Step 902). The speech content is written into a comment area 1004 (Steps 903 and 904).

Next, a speaker mark putting area 1002 is clicked (Step 905), an expression table 1005 is displayed from the speaker mark DB 321, and a speaker mark corresponding to the speech content is selected (Steps 906 and 907). After the speaker mark is selected, a header generation area 1006 is displayed for generating a header of a comment area 1004 (Step 908). After the information to be embedded as the header in the speaker mark is inputted, a speaker mark generation request is made through a speaker mark generation button (Steps 909 and 910). The header information is embedded in the speaker mark (Step 911) and the speaker mark is put to a speaker mark putting area 1002 of the card generation screen 1001 (Step 912).

FIG. 11B shows an example of information the community participant 110 embeds at the time of generation of the card. Steps 901 to 910 described above can generate the card of the screen image 1007. However, the screen image 1007 is merely illustrative but is in no way restrictive.

The speaker mark design generated previously may be preserved and may be called and used again without executing the procedures of Steps 906 and 907 whenever the card is generated. When it is desired to determine the day/time at which the mark is put to the card, the mark putting day/time may be acquired from a timepiece of the participant's terminal 111 when a card equipped with the speaker mark is generated through the generation button.

FIG. 11A shows a data construction embedded in the speaker mark in the community management server 101 and a data example in this embodiment. A user ID 1101, a handle name 1102, a mail address 1103, a user attribute 1104, an access limit 1105, a participation board ID 1106, a display permission flag 1107, etc, are stored on the basis of a predetermined expression standard and in a unified expression form. The display permission flag 1107 represents permission/rejection of display to other community participants.

The data described above is based on the data the community participant 110 requests to the community management server when registering the speaker mark, and cannot arbitrarily be added or changed by the community participant 110.

The information to be embedded in the speaker mark is not limited to the data shown in FIG. 11A, and the information such as the user name 402 and the user contact address 404 of the speaker mark management DB 221 may be embedded, as well. The information that is permitted to be laid open to the public is not limited to the data shown in FIG. 11A, either.

However, the information that might lead to infringement of person's privacy when leaked to a mala fide third party, such as a person's real name and present address, is encoded or enciphered for security purpose. Alternatively, the information of such a kind is not embedded in the speaker mark.

FIG. 11B shows a data construction embedded by the community participant 110 in the speaker mark and a data example in this embodiment. A mark putting day/time 1108, card validity 1109, a keyword 1110, a communication column 1111, a display permission flag 1112, and so forth, are stored on the basis of a predetermined expression standard and in a unified expression form.

The data described above is generated when the community participant 110 generates the speech content of the card.

The mark putting day/time 1108 may be acquired from the timepiece of the participant's terminal 111, or the community participant 110 may arbitrary set it. The board manager 506 or the community participant 110 may arbitrarily set card validity 1108.

The community participant 110 inputs the keyword 1110 and the communication column 1111 when generating the card. The communication column 1111 is a free-column into which the community participant 110 can input self-PR, communication items to other community participants, recruitment, information to be publicized, and so forth. The display permission flag 1112 represents permission/rejection of display to other community participants.

Incidentally, the data the community participant 110 embeds in the speaker mark is not limited to the data shown in FIG. 11B, and other information may be embedded or the members of the board may arbitrarily set the data.

Figure 13A:
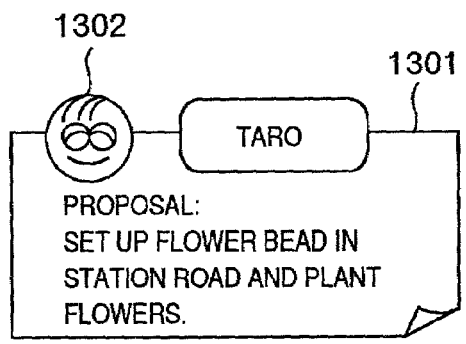
FIGS. 13A, 13B and 13C show image examples of processing screens corresponding to the processing flow shown in FIG. 12, respectively, in the embodiment.
Figure 13B:
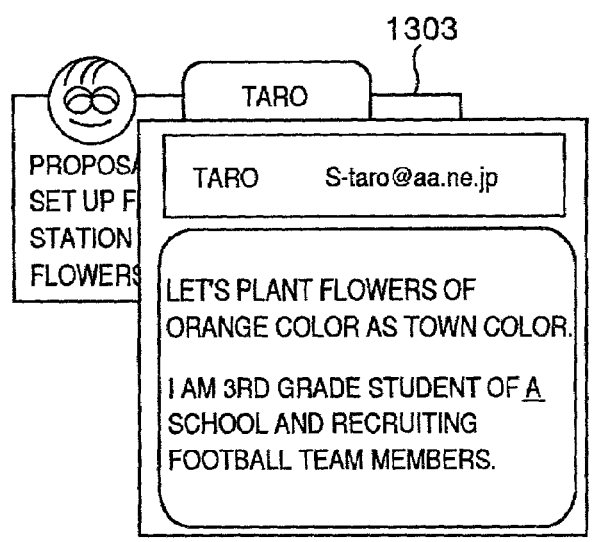
Figure 13C:
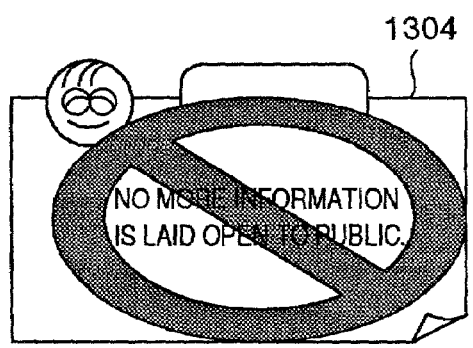

FIG. 12 is a flowchart showing the processing flow for the community participant to look up the information embedded in the speaker mark. This flowchart shows the processing flow for reading the speaker mark at the participant's terminal 111 by using the speaker mark program 3104 and displaying the screen images such as the images 1303 and 1304. FIGS. 13A, 13B and 13C show image examples of the processing screens corresponding to the processing flow in FIG. 12 in this embodiment, respectively.

When other community participant (hereinafter called the "participant B") watches the card screen image 1301 generated by the community participant 110 (hereinafter called the "participant A") and desires to state his view, the participant B clicks first the speaker mark 1302 (Step 1201). Here, whether or not the speaker mark program 3104 for displaying the embedded information of the speaker mark is stored is confirmed by the participant's terminal of the participant B (Step 1202). When the speaker mark program 3104 is stored, the access limit 407 embedded in the speaker mark 1302 generated by the participant A and the participation board ID 408 stored in the speaker mark DB 321 of the participant B are looked up (Step 1203). When both data are coincident, the information when the display permission flags 1107 and 1112 are ON is displayed on the participant's terminal of the participant B among the information embedded in the speaker mark such as the screen image 1303 (Step 1204). The screen image 1303 represents the example of the communication column 1111 where the display permission flag 1107 in FIG. 11A is ON, and the handle name 1102, the mail address 1103 and the display permission flag 1112 in FIG. 11B are ON. Incidentally, the display method is not limited to the screen images 1301 to 1303.

Communication having a content other than the card content can be made by mail or from the contact address described in the communication column on the basis of the information displayed. Incidentally, a notice to the effect that the personal information cannot be disclosed is displayed on the terminals of ordinary users who are not registered as the community participants, users who are not registered as the community participants but have acquired only the mark management program and community participants who fail to satisfy the access limit 407, as represented by the screen image 1304 (Step 1205). However, this display screen 1304 is not restrictive, and voice or other image may be used, too.

According to the procedures shown in FIGS. 7 to 13A, 13B and 13C, a plurality of community participants can smoothly communicate with one another on the theme of the board while securing privacy.

For example, when schools A and B connected by a network such as the Internet form a community, generate a board on "city beautification" and exchange views by using the cards equipped with the speaker mark, communication under the real names can be made among the community participants of the school A. When a student of the school A wants to know what discussion is being made in the school B, the information exchange is possible by using the handle name if the member condition of the board stipulates beforehand that the students and persons concerned of the respective schools are allowed to exchange the information. When any access is made from a complete third party failing to satisfy the member condition or when any malicious access is made, the third party can read from the speech content of the card as to what discussion is being made, but cannot acquire the personal information embedded in the speaker mark. Therefore, the possibility of infringement beyond this level is small.

Since the expression can be added to the speaker mark, delicate expression of participants' feelings can be made and the possibility of misunderstanding can be reduced.

Figure 14:
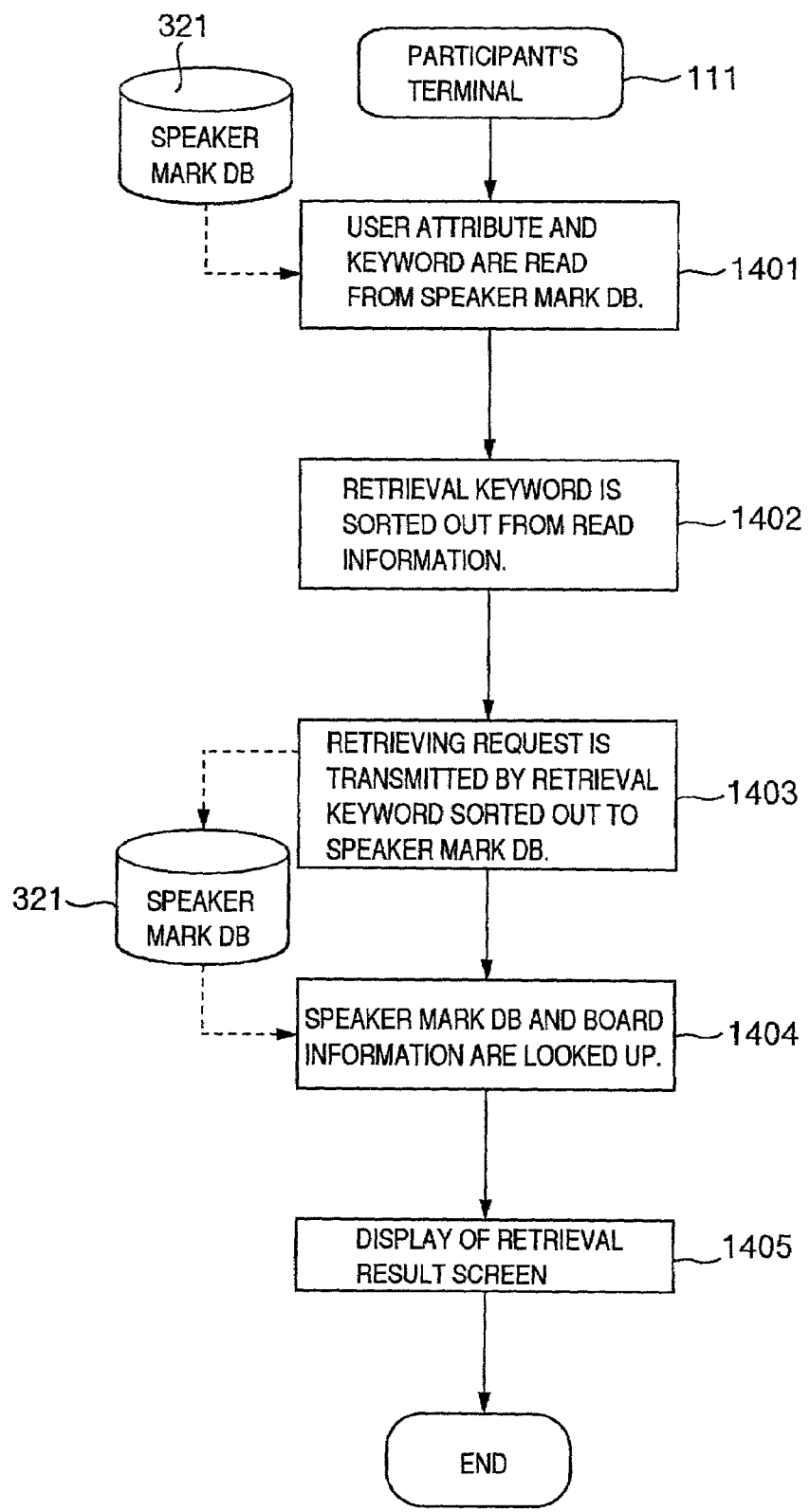
FIG. 14 is a flowchart showing a processing flow for retrieving a card put or pasted on a board in the embodiment.
Figure 15A:
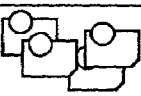
FIGS. 15A, 15B and 15C show image examples of processing screens corresponding to the processing flow shown in FIG. 14 in the embodiment.
Figure 15B:
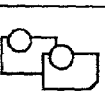
Figure 15C:
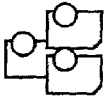

FIG. 14 is a flowchart showing a processing flow of retrieving the cards put on the board in this embodiment. FIG. 14 shows the processing flow for executing the retrieving processing of the card required by the community participant 110 by using the information embedded in the speaker mark 1302 in the card retrieving processing part 3102a when the community participant 110 desires to retrieve the card having the same speech content or to display the opinions of the same school. FIGS. 15A, 15B and 15C show image examples of the processing screens corresponding to the processing flow of FIG. 14 in this embodiment, respectively.

The screen image 1501 shown in FIG. 15A represents the example where the opinions are exchanged among the persons concerned of the schools A and B and the municipal officers about the board entitled "On Beautification of City".

The community participant 110 generates the card equipped with the speaker mark and puts the card onto the screen image 1501 of the board employing the matrix type template displayed on the participant's terminal 111. In this instance, when the participant wants to know what opinions are stated in the cards put on the board that is now displayed or to retrieve the cards having the same opinion as the participant's own opinion, the participant puts the speaker mark 1302 on the speaker mark putting area 1502 for retrieval (Step 1401). The user attribute 406 and the keyword 704 for retrieval are displayed from among the information embedded in the speaker mark 1302. When the speaker mark 1302 contains a plurality of words, the word that is to be used as the keyword is sorted out from these keywords (Step 1402). The keyword retrieving processing part 3102a collates the keyword thus sorted out with the board information embedded to the participant's terminal 111, acquires the card coincident with the retrieval request and displays the retrieving result screen such as the screen image 1503 on the participant's terminal 111 (Steps 1403 to 1405).

The screen image 1503 shown in FIG. 15B represents the example where the card coincident with the retrieving keyword is displayed while being blinked and reversed, but display may be made more visually conspicuous by changing the color, for example.

The keyword portion used for retrieving the card may be displayed while being blinked and reversed, too, or may be displayed more visually conspicuous by changing the color, for example. Furthermore, only the cards coincident with the retrieval request of the community participant 110 may be gathered and displayed as represented by the screen image 1504 shown in FIG. 15C. The retrieving keyword may be directly inputted through the input device 302 by disposing a keyword input area, not only from the information embedded in the speaker mark 1302. When it is desired to retrieve only the cards of other community participants, for example, the handle names, etc, are inputted and the retrieval request is executed. Then, only the cards of the community participants coincident with the retrieval object are displayed while being blinked or reversed, or more visually conspicuous by changing the color, or the like.

Figure 16:
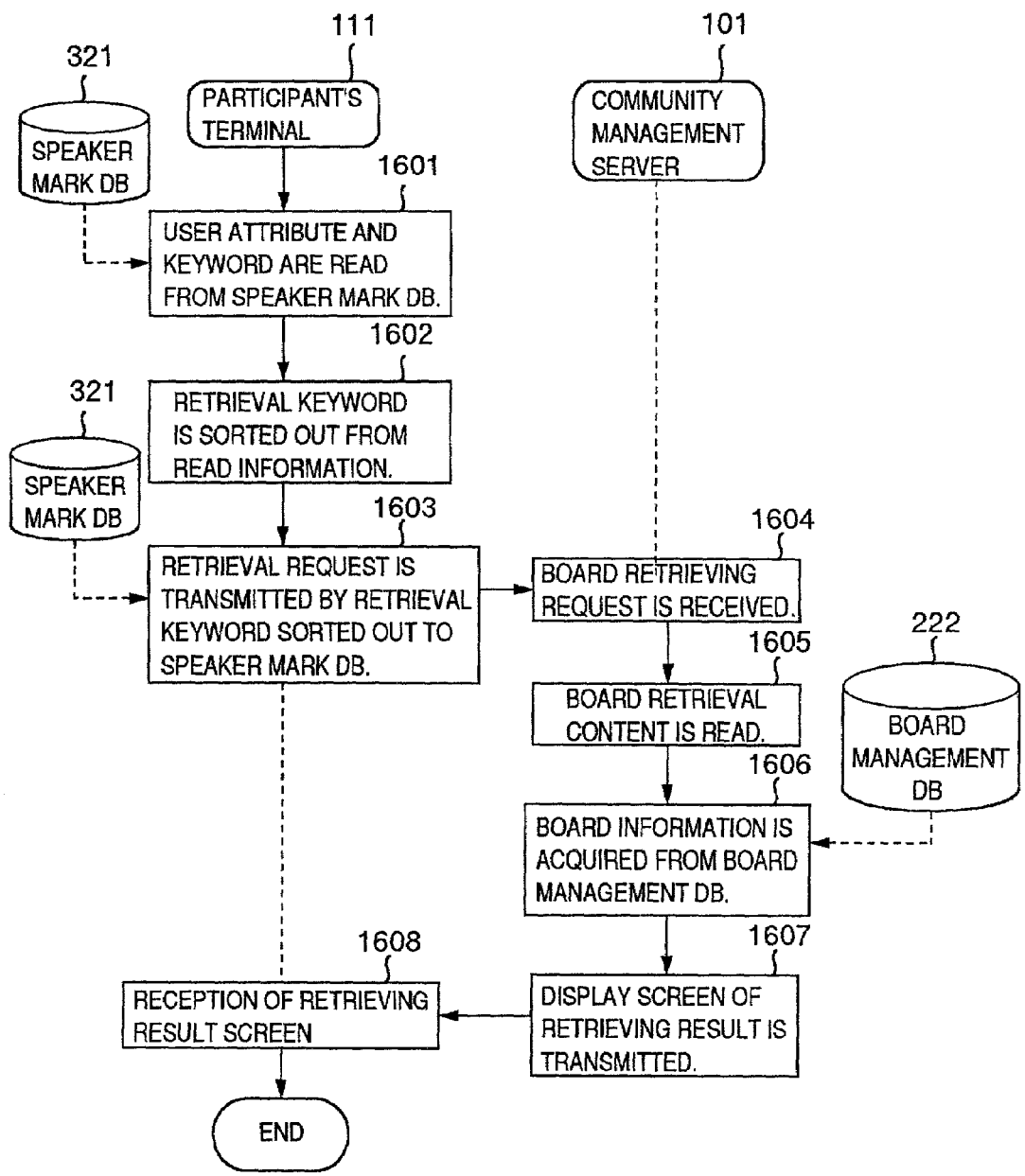
FIG. 16 is a flowchart showing a processing flow for retrieving and guiding a board in the embodiment.
Figure 17A:
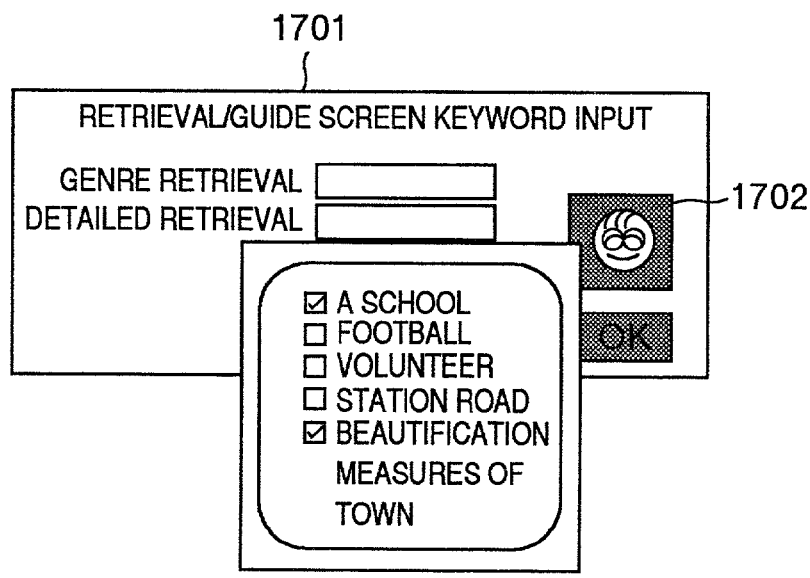
FIGS. 17A and 17B show image examples of processing screens corresponding to the processing flow shown in FIG. 16 in the embodiment.
Figure 17B:

FIG. 16 is a flowchart showing a processing flow for retrieving and guiding the board in this embodiment. FIG. 17 shows a processing flow for executing a retrieving processing of the board requested by the community participant 110 by using the information embedded to the speaker mark 1302 in the board retrieving processing part 2103a when the community participant 110 retrieves a desired board from among a large number of boards, or does not know to which board the card the participant generates is to be put. FIGS. 17A and 17B show image examples of the processing screens corresponding to the processing flow in FIG. 16 in this embodiment.

When the community participant 110 desires to put the card generated by the card generation program 3103 to a suitable board from among a large number of boards, the community participant 110 puts the speaker mark 1302 to the speaker mark putting area 1702 for retrieval on a retrieval/guide keyword inputting screen shown in FIG. 17A (Step 1601). The user attribute 406 and the retrieving keyword 704 are displayed from the information embedded in the speaker mark 1302, and the word that is to be used as the keyword is selected. A retrieval request is then transmitted to the community management server 101 (Steps 1602 and 1603).

Receiving the retrieval request (Step 1604), the board retrieving processing part 2103a of the community management server 101 collates the board retrieving keyword it receives with the board name 502, the board introduction 503, the board genre 504 and the member condition 508 inside the board management DB 222 and acquires the board coincident with the retrieval request (Steps 1605 and 1606). Edition of the screen is made for display at the participant's terminal 111 and the retrieving result is transmitted (Step 1607).

Receiving the retrieval request, the participant's terminal 111 receives then the retrieving result table of the board such as the screen image 1703 shown in FIG. 17B (Step 1608).

In this embodiment, the board is retrieved from the information stored in the board management DB 222, but it is possible to retrieve in further detail by using the information stored in the board log management DB 223.

It is also possible to input the retrieving keyword not only from the information embedded in the speaker mark 1302, but by disposing a keyword input area and directly inputting the keyword through the input device 302.

When the board to which the card generated is to be put is clear in advance, a function of looking up the board by designating the board ID and the board name, to which the card is to be put, may be set, too.

Figure 18A:
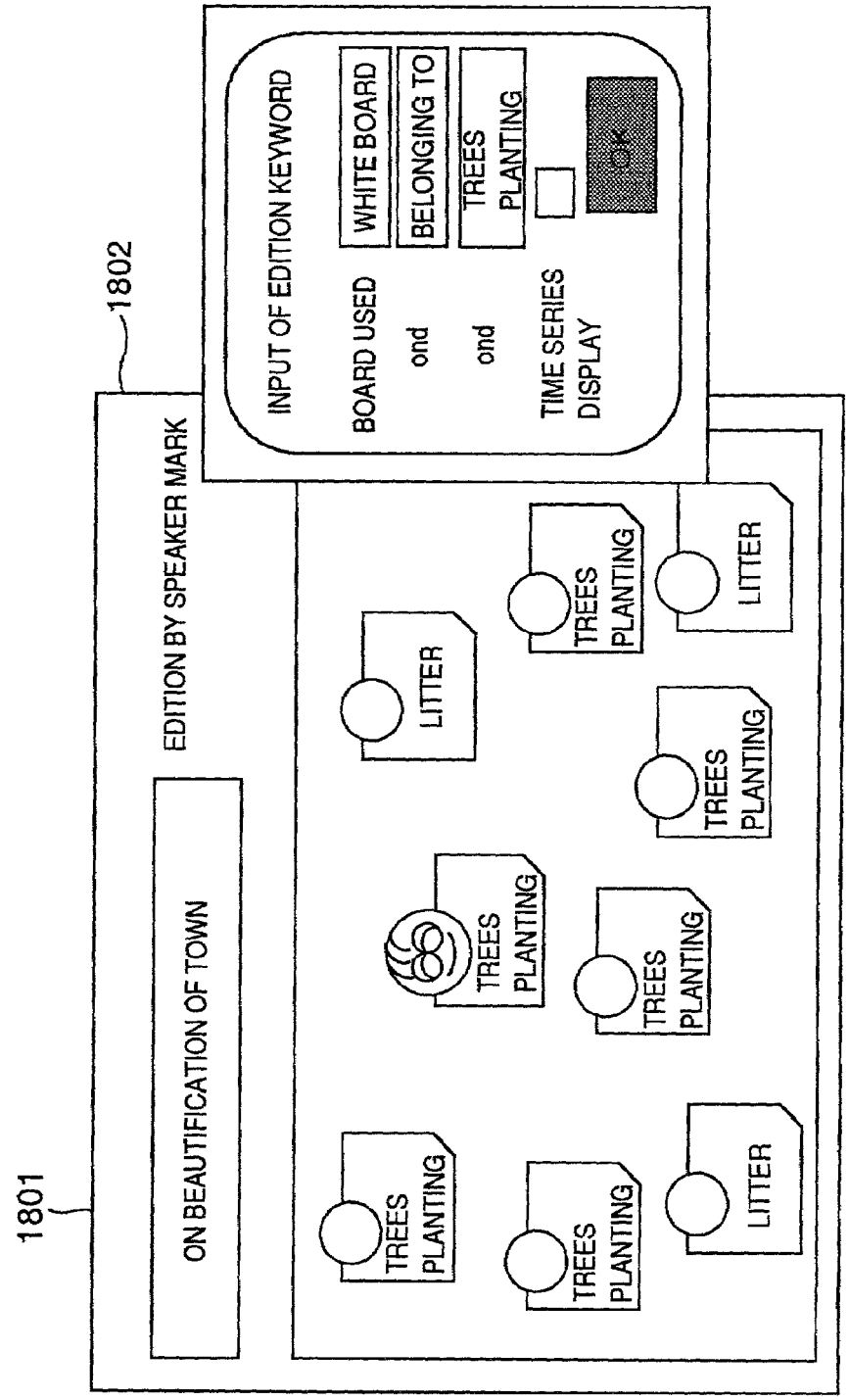
FIGS. 18A, 18B and 18C show image examples of processing screens for editing cards on the board in the embodiment of the present invention.
Figure 18B:
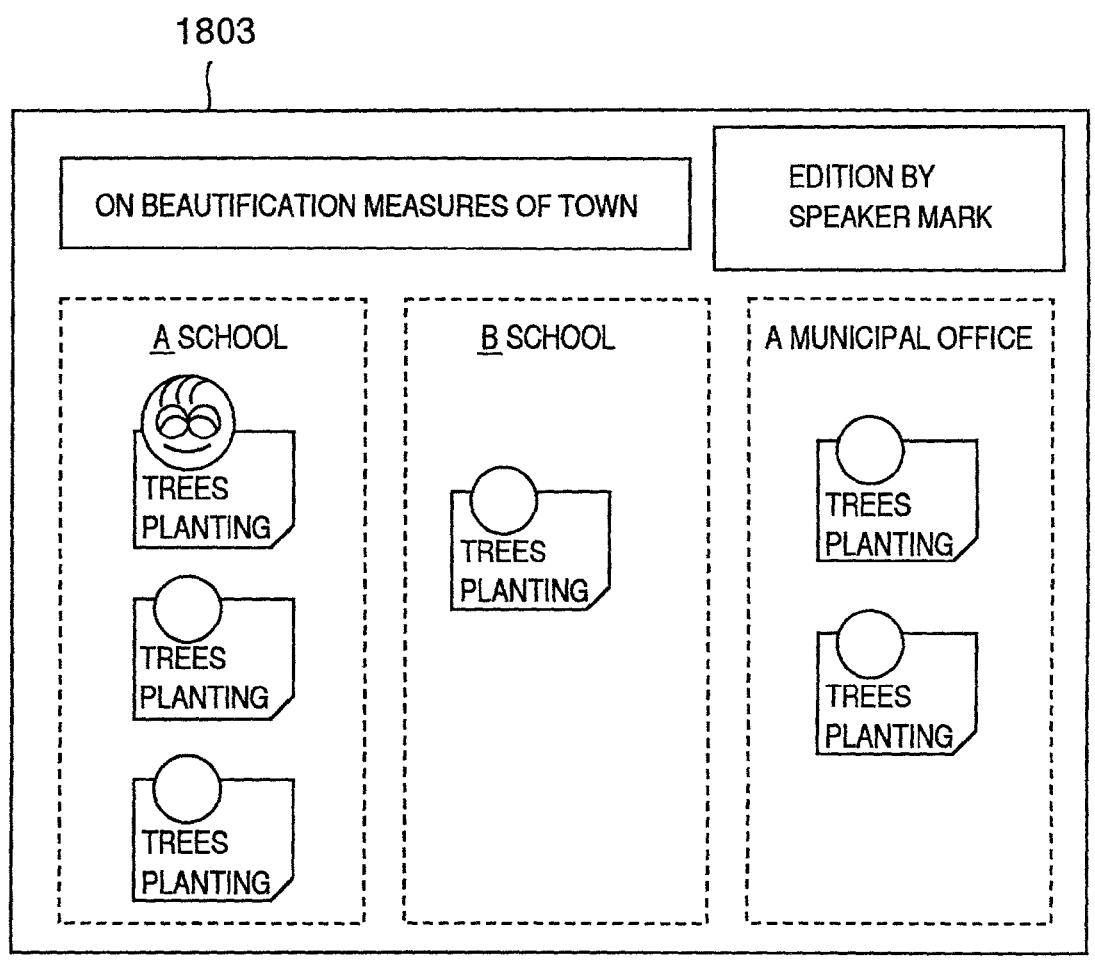
Figure 18C:
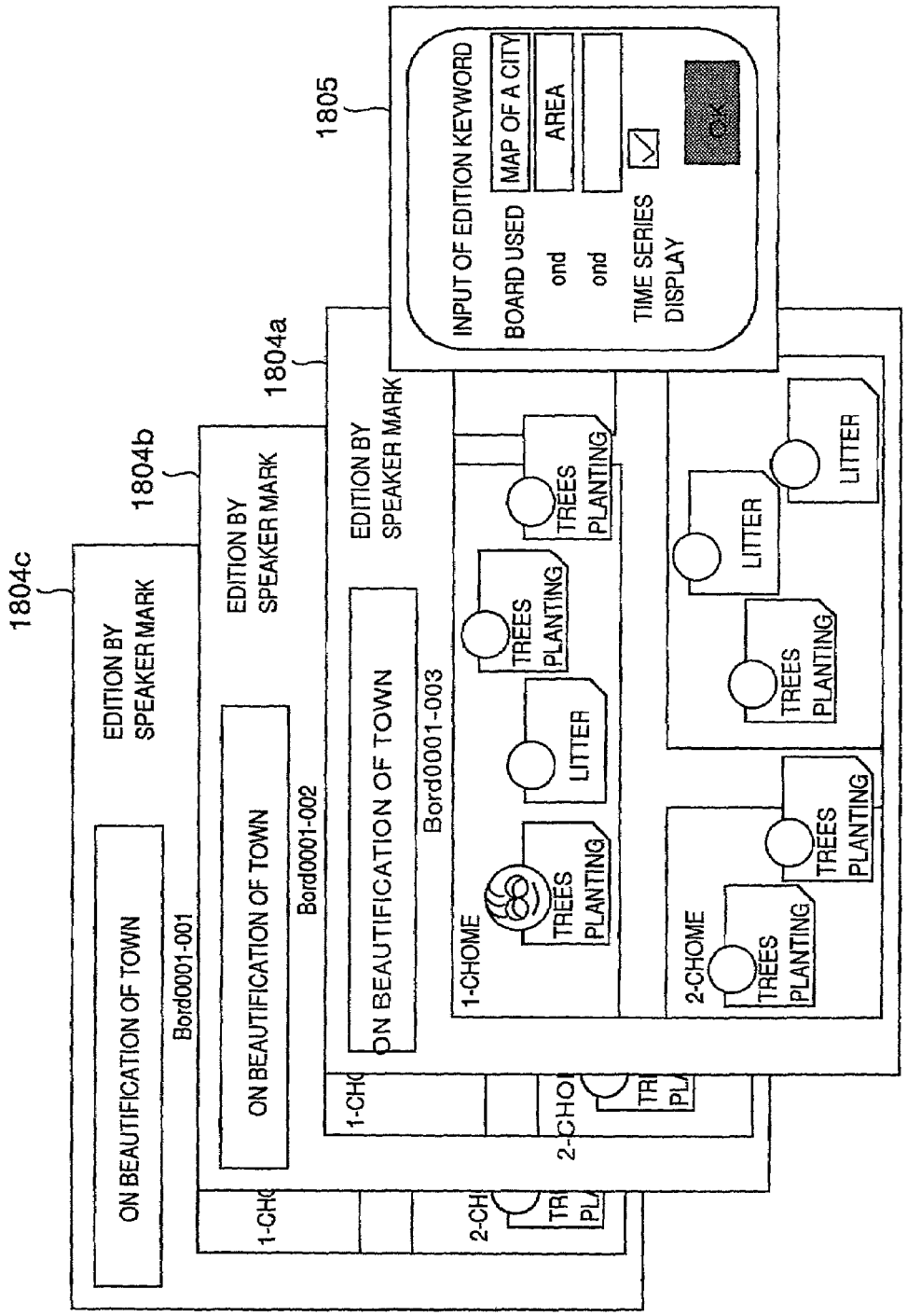

FIGS. 18A, 18B and 18C show image examples of screens for editing the cards on the board in this embodiment. When a white board type template to which the cards can be put freely is used unlike the matrix type template shown in FIG. 15A that arranges and displays the cards, the image examples represent an edition function for grouping the cards or editing them to other board template by using the information embedded in the speaker mark.

The keyword input screen for retrieval is displayed by operating the button of the screen image 1802. When the board template the participant desires to use after edition and the keyword are inputted and edition is then executed, the cards equipped with the speaker mark, in which the opinions about the genre "tree planting" are written, can be edited and displayed in accordance with the group as typified by the screen image 1803 in FIG. 18B. It is possible to use a board template, in which the card equipped with the speaker mark is put to a corresponding position from positional information such as a map of the city A, as represented by the screen image 1804a in FIG. 18C.

When "time series display" of the keyword input screen for retrieval is checked as in the screen image 1805 shown in FIG. 15C, the history of communication can be displayed as in the screen images 1804b and 1804c by using the logs that are accumulated in the time series in the board log management DB 223.

Incidentally, the edition keyword to be embedded in each speaker mark may be designated from the side of the community manager 100. FIGS. 18A, 18B and 18C show the examples where the community manager 100 instructs in advance to embed the genre of the opinion (tree plating or litter), the group (school A or school B or municipal office of city A), the address (1-chome or 2-chome or 3-chome) and the yes/no information as the header of the speech content.

When the number of the cards equipped with the speaker mark increases on the board and the cards overlap with each other, a function of piling the cards in the sequence of the management ID such as the user ID, the mark ID, the mark log management ID, etc, or a function of turning up the cards, may be provided, too.

A function of putting the speaker mark as a perusing party mark to a specific position of the board such as its peripheral portion may be provided at the time of perusal in order to represent that a party perusing the board exists. In this case, a function of sending an individual mail to the perusing party to ask the opinion and capable of confirming the contact address of the perusing and sending the mail may be further provided.

In this embodiment, the board data, the card data and the speaker mark data may be stored in an external memory device such as a hard disk or a CD-ROM and may be read into the information processing unit. Alternatively, a file table is displayed by means of perusal software of the Internet while these data are stored in the server on the network so that the data to be displayed can be selected from the file table.

Though this embodiment explains the example of the communication system in the educational community, the present invention can be applied similarly to various other fields. For example, the memory of a travel is inputted to the card by photos or texts, and the name of the place and the date of the visit are embedded in the speaker mark. The map, photos, etc, of the tourist resort are used as the template or background of the board after they are digitized. An original electronic album or an electronic diary that can be looked through in various ways depending on the member conditions and setting of the edition keyword can be thus created. This also holds true of a stand-alone terminal.

When the community participant embeds a budget of a purchase of a new car and a car model in the speaker mark, the community participant as a potential purchaser can acquire estimate sheets from a plurality of car dealers and can negotiate with the dealers without clarifying the real name and the address. In this way, the community participant can avoid the promotional push of the dealers by telephone or visit. On the other hand, the dealers, too, can judge whether or not the community participant is a promising customer and can offer appropriate information. The community participants in general have not been free from the time limitation and have been obliged to visit each dealer in the past. When the technology of this embodiment is used, however, the community participants can collect similar information by using the personal computer or the hand-held terminal.

Embodiment 2

A communication system equipped with personal identification authentication means using electronic signature embedded in a speaker mark and manipulation (substitution) detection means of a speech content will be explained as an example of another embodiment of the present invention.

A schematic construction of this system is fundamentally the same as the construction shown in FIG. 1, and a hardware construction is fundamentally the same as the construction shown in FIGS. 1 and 2. However, the speaker mark management program 2102 of the community manager server 101 has a function of embedding electronic signature of the community participant in the speaker mark. The speaker mark program 3102 of the participant's terminal 111 has a function of embedding electronic signature of the community participant 110 in the speaker mark, a function of collating a public key attached to the speaker mark with a public key distributed or acquired in advance, displaying the success of personal identification authentication when they coincide and the failure of personal identification authentication when they do not, and a function of collating the information decoded by the public key with the speech content, displaying the absence of manipulation or substitution of the content when they coincide and the existence of manipulation when they do not.

The flows of the registration processing of the speaker mark and its putting processing are fundamentally the same as those shown in FIGS. 9 and 10. However, when the community manager 100 receives the registration request of the speaker mark from the requesting person, authenticates the personal identification of the requesting person and embeds the information in the speaker mark, the community manager 100 embeds the electronic signature of the information in the speaker mark by using the secret key. The public key for decoding is attached to the speaker mark, or the community manager 100 distributes in advance the public key to the community participants 110. Alternatively, the community participant 110 may acquire the public key from the community manager 100 through the community manager WWW server 102 at the time of authentication of personal identification. When the speaker mark is put to the card generated by the community participant 110, electronic signature of the information to be embedded in the speaker mark is embedded in the speaker mark. In this instance, if a feature value of the card content is embedded in the speaker mark, any manipulation of the speech content can be confirmed. The secret key of the community participant 110 is inherent to each community participant, and each community participant 110 and the community manager 100 manage the secret key. When the public key for decoding electronic signature of the community participant 110 is attached to the speaker mark and the number of participating members are limited, the public key of each member may be distributed in advance to specific members, or the community member 110 may acquire the public key from the community manager 100 through the community manager WWW server 102 at the time of authentication of personal identification.

The reference processing flow of the speaker mark in this embodiment is fundamentally the same as the flow shown in FIG. 12.

Figure 19A:
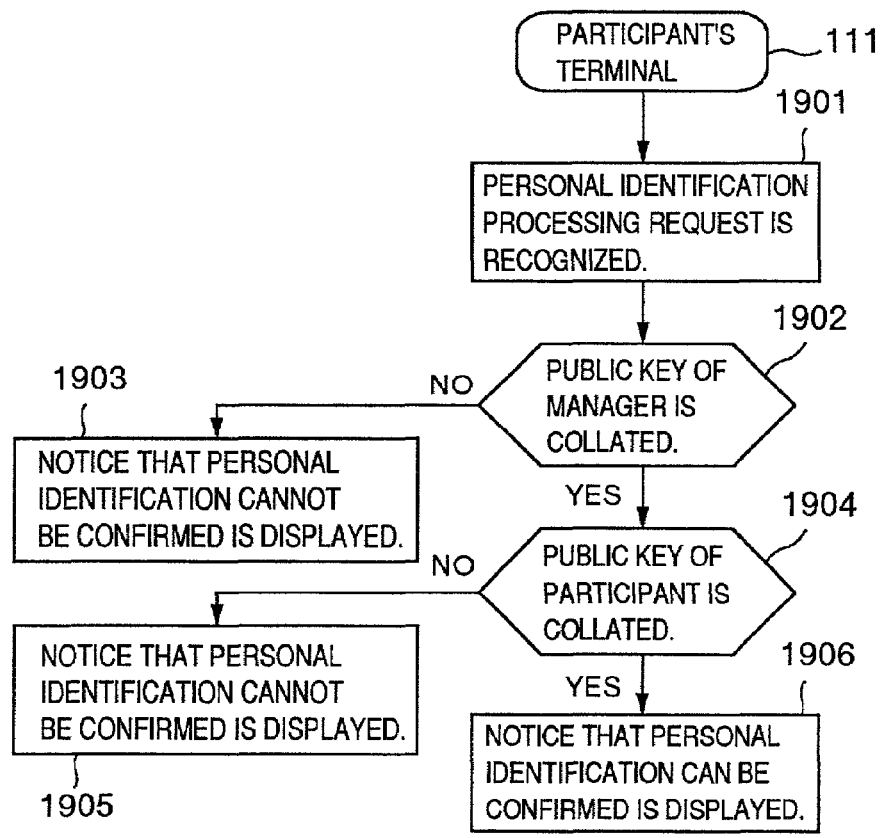
FIGS. 19A and 19B are flowcharts showing an authentication procedure and a content manipulation detection procedure, respectively, in the embodiment.
Figure 19B:
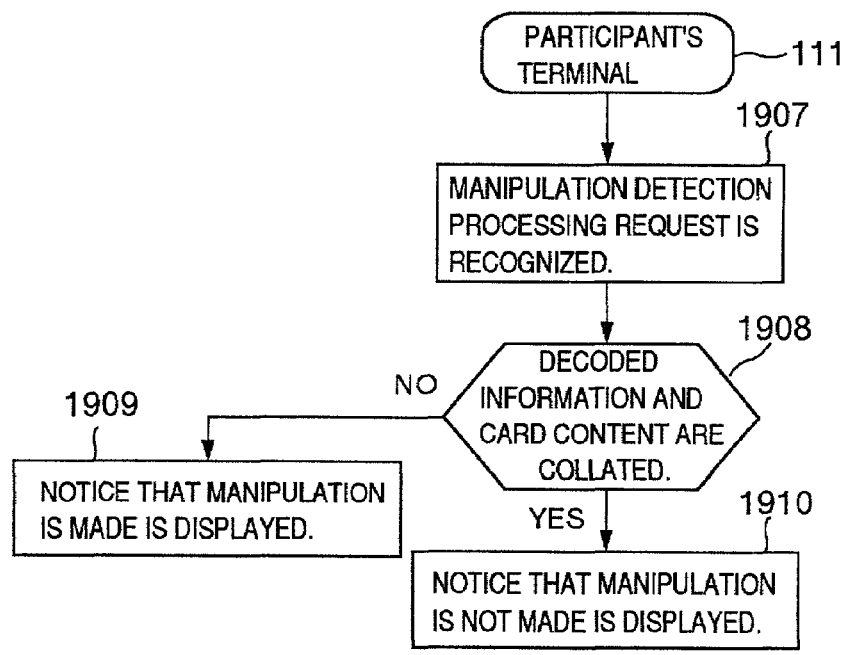

However, the personal identification authentication process and the content manipulation process are added as shown in FIGS. 19A and 19B. Referring to FIG. 19A, the participant's terminal 111 recognizes the personal identification authentication processing request made by clicking of a button or menu by the community participant 110 (Step 1901). The participant's terminal 111 then collates the public key of the community manager 100 attached to the speaker mark with the public key distributed in advance or the public key acquired from the WWW server 102 of the community manager 100 (Step 1902). When they do not coincide with each other, the failure of authentication of personal identification is displayed (Step 1903) and when they do, collation of the public key of the community participant 110 is made in the same way as collation of the public key of the community manager 100 (Step 1904). When the result is not coincident, the failure of authentication of personal identification is displayed (Step 1905) and when it is coincident, the success of authentication of personal identification is displayed (Step 1906). In other words, the community participant 110 can be confirmed as the very person registered to the community management server 101 as the result of Step 1902, and the community participant stating the speech content can be confirmed as the very person registered to the community management server 101 to the community management server 101.

Referring to FIG. 19B, when manipulation (substitution) detection of the speech content is executed, the participant's terminal 111 recognizes the content manipulation detection processing request made by the clicking operation of the button or the menu by the community participant 110 (Step 1907) and collates the feature value of the card content decoded by the public key of the community participant 110 with the feature value of the card content to which the speaker mark is attached (Step 1908). When they do not coincide, manipulation is displayed (Step 1909) and when they do, non-manipulation is displayed (Step 1910). In other words, the speech content is confirmed as being generated by the very community participant 110 registered to the community management server 101 by the Step 1908. The method described above can materialize communication in which personal identification and authenticity of the speech content are critical issues, such as a trial or an international conference, on the network.

Embodiment 3

An example of a communication system using wireless communication by cellular telephones or mobile terminals will be explained as still another embodiment of the present invention.

Figure 20:
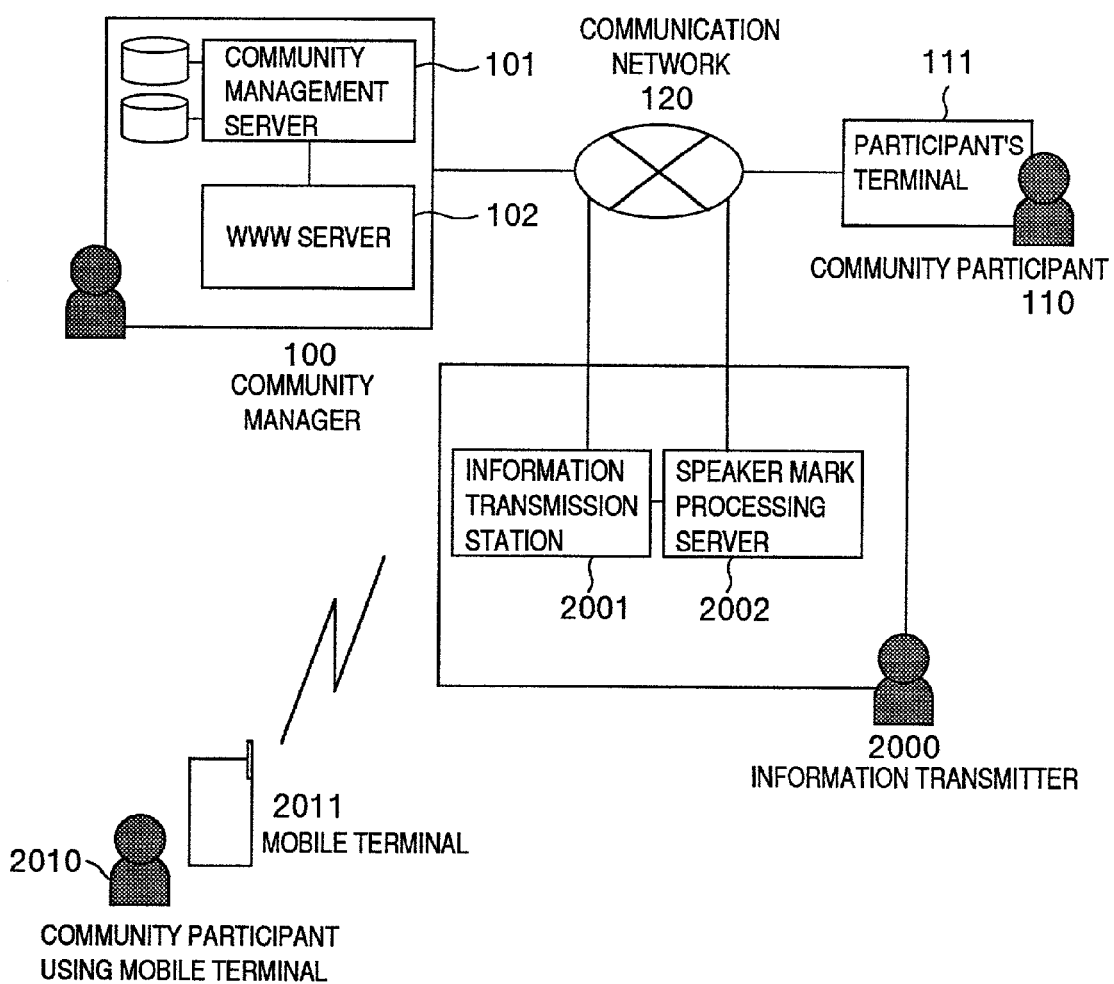
FIG. 20 shows an outline of a construction of a communication system when wireless communication is employed by mobile terminals such as cellular telephones as another system example of the embodiment of the present invention.

FIG. 20 shows a schematic system construction of this embodiment. The system construction is fundamentally the same as the construction shown in FIG. 1. This embodiment is different in that the system includes an information distributor 2000 that gathers Web pages laid open to public by the manager WWW server 102 and distributes the information to the mobile terminals. The information distributor 2000 manages an information distribution station 2001 for distributing information to mobile terminals 2011 of the community participants 2010 using the mobile terminals and a speaker mark management server 2002 for collating an access condition of the speaker mark with the attribute information of the community participant 2010 before the information is distributed, and for displaying the information embedded in the speaker mark on the basis of the collation result. The community manager 100 may serve also as the information distributor 2000.

The flows of the registration processing of the speaker mark and its putting processing in this embodiment are fundamentally the same as those shown in FIGS. 9 and 10. However, the registration processing and the putting processing may not be made from the cellular telephone set the inputting capacity of which is limited.

The reference processing flow of the speaker mark in this embodiment is substantially the one shown in FIG. 12. However, in the reference processing flow, the flow for confirming approval/rejection of displaying the personal information embedded in the speaker mark such as existence/absence of plug-in, collation of the access limit embedded to the speaker mark with the participation board ID stored in the participant's terminal 111 may be executed through the speaker mark management server 2002 managed by the information distributor 2000. In this case, when the mobile terminal 2011 requests transmission of the card equipped with the new speaker mark in the specific board to the information distributor 2000, it transmits also the information necessary for judging approval/rejection of displaying personal information embedded in the speaker mark such as the user ID 401 and the board ID 408. The mobile terminal 2011 receiving the speaker mark after the processing described above and the speech content may be provided with display control means for displaying the speaker mark on the screen of the mobile terminal 2011 within the term of validity of the speaker mark.

A provider offering the Internet connection service may execute the approval/rejection confirmation processing of the personal information of the speaker mark, such as the information distributor 2000, and may transmit the personal information embedded in the speaker mark together with the speech content to the community participant terminals 111 contracted with the provider.

A function may be provided, too, that displays not only the text and the image of the card content but also other cards interlinking with the card, home pages interlinking with the card, or other multimedia data interlinking with the card such as document data, dynamic images and still images.

Furthermore, a function of not only displaying but also downloading the card content and other multimedia data interlinking with the card from the card may be set.

As described above, the system according to the present invention uses the speaker mark which the data of the speaker is embedded in and has the element symbolizing the speaker. Therefore, even in the field of communication by anonymity utilizing a nickname, the system of the present invention can display the attribute information and the mail address of the speaker or can authenticate personal identification. In other words, the present invention can accomplish a communication system that lets the information transmitting party take responsibility for the speech while protecting privacy. As the speech content is retrieved/edited in accordance with the position of the speaker or with the genre of the speech content by using the speaker mark, the system can easily display the history and the result of communication.

When the personal information is displayed or the speech content is retrieved or edited on the basis of the attribute information, the present system uses the information embedded in the speaker mark without gaining access to the community management server to acquire the data. Therefore, the system can reduce the network load of the community manager and the communication load of the community participants.

What is claimed is:

1. A method of retrieving information, comprising the steps of:
   preparing one or more boards each having one or more cards put thereon in advance,
   wherein each board is a site for allowing communications and retrieving of information between participants in a discussion on the board, and
   wherein each card holds speech content of one of the participants;
   detecting if a speaker mark is included in speaker mark areas on a board,
   wherein the speaker mark holds information regarding the participant and content of the card;
   if the speaker mark is detected, extracting information including participant attribute, and a keyword specified by the participant to be used to conduct a retrieval from information embedded in said speaker mark and displaying the extracted information;
   prompting the participant to take actions for selecting the keyword, said actions including sorting out said keyword from said displayed information and inputting said keyword;
   collating said keyword specified by the participant with information from a board stored in a cache in a client terminal being used by the participant; and
   displaying in a highlighted manner information of a card included on said board, said card matching said keyword.

2. A communication system comprising:
   a client terminal; and
   a server,
   wherein said client terminal comprises:
   means for preparing one or more boards each having one or more cards included therein,
   wherein each board is a site for allowing communications and retrieving of information between participants and in a discussion on the board,
   wherein each card holds speech content of one of the participants,
   wherein said client terminal is being used by a participant,
   means for detecting if a speaker mark is included in speaker mark areas on a board,
   means, responsive to detection of the speaker mark, for extracting information including participant attribute, and a keyword specified by the participant to be used to conduct a retrieval from information embedded in said speaker mark and displaying the extracted information,
   means for prompting the participant to take actions for specifying the keyword, said actions including sorting out said keyword from said displayed information and inputting said keywords,
   means for transmitting a retrieval request to a server, said retrieval request, including said keyword specified by the participant requesting that a retrieval process be conducted using said keyword
   means for receiving a retrieval result resulting from conducting the retrieval process from said server, and
   means for editing and displaying said retrieval result using information embedded in multimedia data of a board, and
   wherein said server comprises:
   means for receiving said retrieval request from said client terminal
   means, responsive to receiving said retrieval request, for retrieving a board genre providing information regarding the types of discussions held on the board, introduction providing information regarding the purpose of the discussions held on the board and member condition providing information regarding conditions for becoming a participant of the board from a board management database, and
   means for transmitting the retrieval result to said client terminal.

3. A method of editing contents of various boards each board being a site for allowing communications and retrieval of information between participants in a discussion on the board, said method comprising the steps of:
   embedding in a speaker mark an editing keyword as a header to be used to identify a card for editing,
   putting one or more cards on a first board, said one or more cards each having said speaker mark placed therein,
   wherein each card holds speech content of one of the participants, and
   wherein the speaker mark holds information regarding the participant and content of the card,
   preparing templates of a second board for use in editing the first board,
   inputting an extraction keyword to be used to extract corresponding information,
   in response to the inputting of the extraction keyword, extracting a card matching the extraction keyword from the cards included on said first board, and
   inserting the extracted card on the second board based on an attribute of a certain characteristic of said second board.

* * * * *